(12) United States Patent
Sugimoto et al.

(10) Patent No.: US 9,223,655 B2
(45) Date of Patent: Dec. 29, 2015

(54) STORAGE SYSTEM AND METHOD FOR CONTROLLING STORAGE SYSTEM

(71) Applicant: Hitachi, Ltd., Tokyo (JP)

(72) Inventors: Sadahiro Sugimoto, Tokyo (JP); Junji Ogawa, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 14/351,946

(22) PCT Filed: Jul. 26, 2013

(86) PCT No.: PCT/JP2013/070298
§ 371 (c)(1),
(2) Date: Apr. 15, 2014

(87) PCT Pub. No.: WO2015/011825
PCT Pub. Date: Jan. 29, 2015

(65) Prior Publication Data
US 2015/0154075 A1    Jun. 4, 2015

(51) Int. Cl.
G06F 11/00    (2006.01)
G06F 11/10    (2006.01)
G06F 3/06    (2006.01)

(52) U.S. Cl.
CPC ........... *G06F 11/1096* (2013.01); *G06F 3/06* (2013.01); *G06F 11/1076* (2013.01); *G06F 11/1092* (2013.01)

(58) Field of Classification Search
None
See application file for complete search history.

(56) References Cited

U.S. PATENT DOCUMENTS

| 5,586,291 | A | * | 12/1996 | Lasker et al. | 711/113 |
| 5,636,359 | A | * | 6/1997 | Beardsley et al. | 711/122 |
| 5,875,479 | A | * | 2/1999 | Blount et al. | 711/162 |
| 5,987,621 | A | * | 11/1999 | Duso et al. | 714/4.11 |
| 6,625,750 | B1 | * | 9/2003 | Duso et al. | 714/11 |
| 7,269,690 | B2 | * | 9/2007 | Abe et al. | 711/114 |
| 2010/0107003 | A1 | | 4/2010 | Kawaguchi | |
| 2012/0173790 | A1 | * | 7/2012 | Hetzler et al. | 711/103 |
| 2014/0281688 | A1 | * | 9/2014 | Tiwari et al. | 714/6.22 |

FOREIGN PATENT DOCUMENTS

| JP | 06-051918 A | 2/1994 |
| JP | 07-152499 A | 6/1995 |
| JP | 10-031563 A | 2/1998 |
| JP | 2001-175423 A | 6/2001 |

* cited by examiner

*Primary Examiner* — Gabriel Chu
(74) *Attorney, Agent, or Firm* — Volpe and Koenig, P.C.

(57) ABSTRACT

Provided is a storage system which allows reliability to be improved by recovering target data relatively early. A plurality of storage apparatuses 210 forms a parity group 230 for data recovery. An FM board 150 serving as a first memory apparatus is a large-capacity memory apparatus with a parity calculation function 1512. In carrying out a data recovery process, the FM board 150 acquires other data D0 and D1 and a parity P0 needed to recover target data D2, and carries out a predetermined parity calculation by the parity calculation function to recover the target data D2. When the recovered data D2 is written to a plurality of different FM boards 150, the data D2 becomes redundant and the data recovery process is therefore considered to be complete.

7 Claims, 33 Drawing Sheets

RAID group management table

| Group # | RAID level | Number of Drives | Drive #0 | Drive #1 | ... | Drive #n |
|---|---|---|---|---|---|---|
| 0 | RAID5 | 4 | 0 | 1 | ... | — |
| 1 | RAID6 | 8 | 6 | 7 | ... | — |
| 2 | RAID1+0 | 4 | 14 | 15 | ... | — |

C110, C111, C112, C113, C113, C113

(b)

Drive management table

| Drive # | Drive status | Spare # | Rebuild progress position |
|---|---|---|---|
| 0 | Normal | — | — |
| 1 | Failed | 4 | — |
| 2 | Normal | — | — |
| 3 | Normal | — | — |
| 4 | Spare | — | 1528 |
| 5 | Unassigned | — | — |
| 6 | Normal | — | — |
| ... | ... | ... | ... |

FM address mapping table T15

| LBA | Physical address C151 | | | |
|---|---|---|---|---|
| C150 | Chip number C1510 | Block number C1511 | Page number C1512 | Offset C1513 |
| 0 | 3 | 0x 0025 4F91 | 24 | 1 |
| 1 | 2 | 0x 001A 290C | 37 | 0 |
| 2 | 2 | 0x 0005 2CF5 | 11 | 12 |
| 3 | 0 | 0x 0010 7620 | 15 | 2 |
| ... | ... | ... | ... | ... |

Fig. 21

| Result storage destination address | 0x 0000 0010 039B 7CA2 |
|---|---|
| Data length | 16 |
| RAID level | RAID5 |
| Number of drives | 4 |
| Creation target data number | 2 |
| Logical address [0] of input data | 0x 05F1 381E |
| Logical address [1] of input data | 0x 1279 2EA0 |
| ... | ... |
| Logical address [N-1] of input data | 0x 1CA2 37F2 |

Fig. 33

| Segment amount management table T16 ||
| --- | --- |
| Type | Number of segments |
| All segments | 4194304 |
| Clean segments | 2132125 |
| Dirty segments | 1532492 |
| Free segments | 529687 |
| Dirty segments for rebuild | 0 |

STORAGE SYSTEM AND METHOD FOR CONTROLLING STORAGE SYSTEM

TECHNICAL FIELD

The present invention relates to a storage system and a method for controlling a storage system.

BACKGROUND ART

An increase in storage density and a reduction in cost per capacity (bit cost) can be more easily achieved for flash memories than for volatile memories (hereinafter referred to as RAMs) such as DRAMs (Dynamic Random Access Memories) or SRAMs (Static Random Access Memories). Moreover, flash memories provide faster access performance than magnetic disks and the like. Thus, utilizing a flash memory as a disk cache enables an inexpensive large-capacity disk cache to be created.

The storage capacities of flash memories have been increasing year after year, and the capacities of SSDs (Solid State Drives) using a flash memory as a storage medium have kept increasing. On the other hand, magnetic disks have been proved excellent for a long time and the capacities of HDDs (Hard Disk Drives) using a magnetic disk have continuously been increasing.

Storage systems adopt a data redundancy technique called RAID (Redundant Arrays of Inexpensive Disks). The RAID technique uses a plurality of drives (HDDs or SSDs) to make data redundant to improve reliability of data storage. For example, in RAID5, data is not lost even if any one of the plurality of drives forming a RAID group fails.

Data in a failing drive can be recovered by calculating data and a parity read from another normal drive. Redundancy can be recovered by writing recovered data to a reserved drive and incorporating the reserved drive into the RAID group. A data recovery process is hereinafter referred to as a rebuild process.

However, if failures occur in a row (a double failure occurs), redundancy may fail to be recovered and data may be lost. That is, when a failure occurs in another drive in the same RAID group before a rebuild process on the first failure is completed, the rebuild process on the first failure fails to be achieved and the data is lost. RAID6 can simultaneously resist up to two failures, but when the third consecutive failure occurs, a problem similar to the problem described for RAID5 occurs and the data is lost.

Thus, a time needed for a rebuild process is preferably minimized in order to improve the reliability of the storage system. However, the drive capacity has kept increasing year after year, and HDDs have relatively low I/O (Input/Output) speeds. Consequently, the time for the rebuild process tends to extend.

PTL 1 discloses what is called a distributed RAID. The distributed RAID technique manages stripes containing data and parities by distributing the stripes among a plurality of drives each providing a storage area in a capacity pool.

CITATION LIST

Patent Literature

[PTL 1]
US Patent Application Publication No. 2010/0107003

SUMMARY OF INVENTION

Technical Problem

According to the conventional technique, a time needed to write recovered data to a drive can be reduced. However, if a failure occurs in any drive in the capacity pool, the failure disadvantageously has a wide range of adverse effects. Furthermore, the rebuild process needs a parity calculation, which imposes a load on a processor of a storage controller. This may degrade response performance for normal I/O processes (a read process, a write process, and the like).

In view of the foregoing object, it is an object of the present invention to provide a storage system and a method for controlling a storage system in which target data is recovered relatively early to allow reliability to be improved. It is another object of the present invention to provide a storage system and a method for controlling a storage system in which a first memory apparatus with a calculation function is utilized to carry out a calculation in the first memory apparatus to allow target data to be recovered early, while suppressing an increase in loads on a control apparatus.

Solution to Problem

To achieve these objects, the present invention provides a storage system having a plurality of memory apparatuses and a plurality of storage apparatuses, the plurality of storage apparatuses forming a parity group for data recovery, the storage system including a control apparatus controlling the plurality of memory apparatuses and the plurality of storage apparatuses, a first memory apparatus included in the plurality of memory apparatuses and having a calculation function and a large capacity, and a second memory apparatus included in the plurality of memory apparatuses and having a smaller capacity than the first memory apparatus, wherein, when carrying out a data recovery process for recovering target data stored in a storage apparatus, of the plurality of storage apparatuses, which is a recovery target, the control apparatus acquires other data and a parity needed to recover the target data, transmits the acquired other data and parity to the first memory apparatus, and allows the first memory apparatus to carry out a predetermined parity calculation using the calculation function, to recover the target data.

The first memory apparatus is provided in plurality, and when recovered data resulting from recovery of the target data is stored in the plurality of first memory apparatuses, the control apparatus may consider a data recovery process to be complete.

BRIEF DESCRIPTION OF DRAWINGS

FIG. 5 (*a*) shows an exemplary configuration of a table that manages a RAID group, and FIG. 5(*b*) shows an exemplary configuration of a table that manages drives.

FIG. 11 shows an exemplary configuration of a table that manages correspondences between logical addresses and physical addresses in a flash memory.

FIG. 21 is an exemplary configuration of a parity calculation request message for specifying parameters for a parity calculation process executed by the FM processor.

FIG. 33 is a diagram illustrating a segment amount management table.

DESCRIPTION OF EMBODIMENTS

Figure 1:
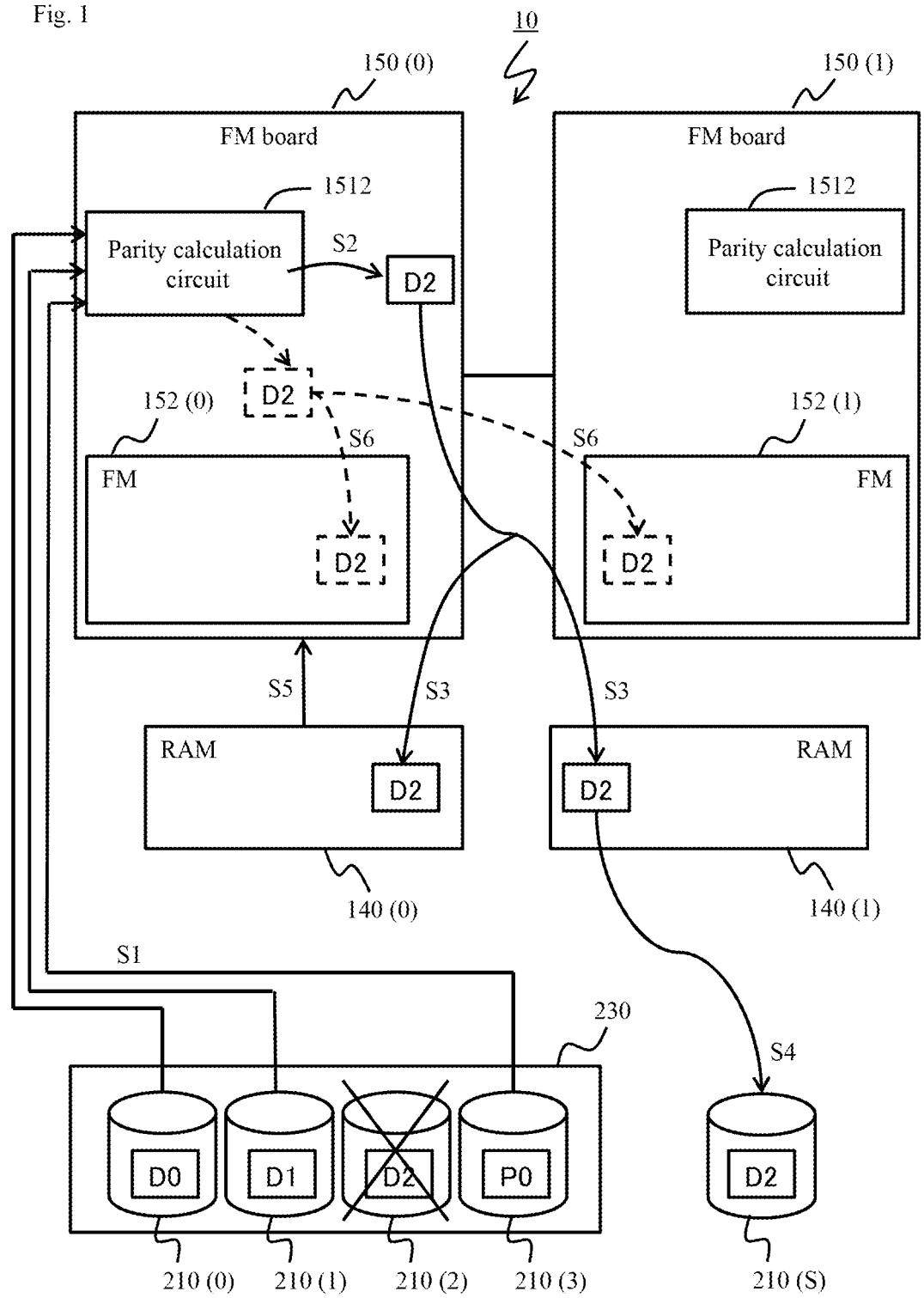
FIG. 1 is a diagram schematically illustrating an embodiment.

An embodiment of the present invention will be described below with reference to the drawings. As described with reference to FIG. 1 to FIG. 3, a storage system 10 according to the present embodiment has a storage controller 100, a memory 140 such as a DRAM which operates at a high speed and which has a small capacity, a flash memory 152 which operates at a higher speed and which has a larger capacity than DRAMs, an FM board controller 151 that controls the flash memory, and a drive 210 as a persistent data storage.

The FM board controller 151 includes, for example, an FM processor 1510 and a parity calculation circuit 1512. The FM board controller 151 creates parity data and recovers data in accordance with a request from a CPU 130 in the storage controller 100. Since the parity creation process and the data recovery process are carried out in an FM board 50, a reduction can be achieved in the amount of data flowing through the storage controller 100 and in loads imposed on the CPU 130 in the storage controller 100. Thus, a rebuild process is sped up to improve the reliability of the storage system 100.

FIG. 1 is a diagram schematically illustrating the present embodiment. FIG. 1 is created for convenience of understanding of at least a part of the present embodiment. The scope of the present invention is not limited to a configuration shown in FIG. 1.

The storage system 10 includes, for example, a plurality of FM boards 150(0) and 150(1) serving as an example of a "first memory apparatus", a plurality of RAMs 140(0) and 140(1) serving as an example of a "second memory apparatus", and a plurality of drives 210(0) to 210(3) and 210(S). As described below, the storage controller 100 in the storage system 10 includes the CPU 130 to process commands from a host computer 20. Parenthesized numbers appended to reference signs are hereinafter omitted provided that the corresponding components are not particularly distinguished from one another.

The FM board 150 includes, for example, a flash memory 152 and the parity calculation circuit 1512. Moreover, as described below in the embodiment, the FM board 150 includes the FM processor 1510 and a buffer RAM 153.

The drive 210 serving as a "storage apparatus" may be any of various drives to which data are written and from which data are read, for example, a hard disk device, a semiconductor memory device, an optical disk device, or a magneto-optical disk device. When a hard disk device is used as the drive 210, for example, an FC (Fibre Channel) disk, an SCSI (Small Computer System Interface) disk, an SATA disk, an ATA (AT Attachment) disk, or an SAS (Serial Attached SCSI) disk may be used. Furthermore, for example, any of various drives may be used, for example, a flash memory, an MRAM (Magnetoresistive Random Access Memory), a phase-change memory, an ReRAM (Resistive Random-Access Memory), and an FeRAM (Ferroelectric Random Access Memory). Moreover, for example, different types of drives may be mixed.

A RAID group (parity group) 230 of RAID5 is formed of a predetermined number of drives 210(0) to 210(3). One stripe includes data D0 stored in the first drive 210(0), data D1 stored in the second drive 210(1), data D2 stored in the third drive 210(2), and a parity P0 stored in the fourth drive 210(3).

If a failure occurs in the third drive 210(2) to preclude data write to and data read from the third drive 210(2), the data D0 and D1 and the parity P0 are read from the other normal drives 210(0), 210(1), and 210(3) and input to the parity calculation circuit 1512 of the FM board 150 (S1). The data D0 and D1 and the parity P0 are an example of "other data and a parity needed to recover target data".

The parity calculation circuit 1512 calculates an exclusive OR (XOR) between the data D0 and D1 and the parity P0 to obtain the recovery target D2 (S2). The recovered data D2 is stored in a plurality of RAMs 140(0) and 140(1) (S3), and then written to a spare drive 210(S) (S4).

According to the present embodiment, a process for writing cached data to the drive 210 is hereinafter referred to as a destage process. A process for transferring data in the drive 210 to a cache is hereinafter referred to as a staging process. A process for recovering target data is hereinafter referred to as a rebuild process. A series of processes of recovering the target data and writing the recovered data to the spare drive 210 may hereinafter be referred to as a collection copy process.

The RAM 140 allows high-speed data write and read but has a smaller storage capacity than the flash memory 152. Furthermore, when the drive 210 is a hard disk drive or the like, write speed is low and write to the hard disk drive or the like is a bottleneck to the rebuild process (or the collection copy process).

Thus, recovered data to be written to the drive 210 gradually accumulates in the RAM 140. Then, when the amount of recovered data accumulated in the RAM 140 reaches a predetermined upper limit value (S5), a storage destination of the recovered data switches from the RAM 140 to the flash memory 152 (S6). The data recovered by the parity calculation circuit 1512 is written to the flash memories 152 in the respective different FM boards 150 (S6).

The recovered data can be made redundant by writing the recovered data to the plurality of different flash memories 152. According to the present embodiment, when the recovered data is written to the plurality of flash memories 152, that is, when dual writing of the recovered data to the flash memory 152 is completed, the rebuild process is considered to be complete.

Subsequently, the recovered data cached in the flash memory 152 is written to the spare drive 210(S) in a timely manner. The recovered data cached in the plurality of flash memories 152 is in a state of dirty data. When the recovered data is written to the spare drive 210(S), that is, when a destage process is completed, the recovered data cached in the flash memory 152 changes to a state of clean data.

According to the present embodiment described above, the parity calculation circuit 1512 in the FM board 150 is used to calculate a parity calculation. This eliminates the need for the CPU 130 in the storage controller 100 to carry out a parity calculation, enabling a reduction in loads on the CPU 130. As a result, the CPU 130 can carryout another type of command processing, thus improving the performance of the storage system 10.

The flash memory 152 is characterized by being unable to be overwritten and is limited in that the number of erasures that can be performed on a memory cell is finite. Thus, a destination address for data write needs to be changed for every data write, read, or erase, or data needs to be rearranged (wear leveling) in order to level the numbers of erasures among the memory cells. Thus, compared to other memories such as DRAMs, the flash memory 152 performs complicated control, and thus, the FM board 150 has a control function. When the control function of the FM board 150 is expanded and the parity calculation circuit 1512 is mounted in the FM board 150, a parity calculation can be carried out in the FM board 150. This allows data to be efficiently read from and written to the RAID group 230. Consequently, the parity calculation circuit 1512 can be relatively inexpensively added to the FM board 150, enabling a reduction in loads on the CPU 130. Hence, the present embodiment takes advantage of the technical features of the FM board 150 managing the flash memory 152 that needs to be controlled, and mounts the parity calculation circuit 1512 in the FM board 150.

The present embodiment writes the recovered data to the flash memory 152 to allow the redundancy of the data to be ensured. Thus, when all the data held in the failing drive is written to the flash memory 152, the rebuild process may be considered to be complete. This enables a reduction in the time needed for the rebuild process compared to a case where rebuilding is carried out on the drive 210. The present embodiment completes the rebuild process before the end of the destage process (or before execution of the destage process), preventing the speed of write to the drive 210 from being a bottleneck to performance. The present embodiment can complete the rebuild process early, enabling a reduction in the possibility of data loss caused by a double failure. This allows the reliability of the storage system 10 to be improved.

Furthermore, the FM board 150 generally has a larger storage capacity than the RAM 140 and can thus hold a larger amount of data than the RAM 140 after rebuilding. Thus, the rebuild process can be completed early.

The present embodiment carries out a rebuild process by allowing the parity calculation circuit 1512 in the FM board 150 to recover data and writing the recovered data to the plurality of flash memories 152 on the respective different FM boards 150. This enables a reduction in loads on the CPU 130 in the storage controller 100, in the amount of data flowing through an internal bus in the storage controller 100 during the rebuild process, and thus in loads on the internal bus and the RAM, while allowing the rebuild process to be ended in a relatively short time. Therefore, the reliability is improved.

The present embodiment initially writes the recovered data to the drive 210 via the RAM 140, and when the amount of a part of the RAM 140 used reaches an upper limit value, writes the recovered data to the plurality of flash memories 152. Then the rebuild process is considered to be complete.

That is, the present embodiment initially carries out a destage process for writing the recovered data to the drive 210 via the RAM 140. When the recovered data accumulates in the RAM 140 up to the predetermined upper limit value, the destage process is stopped and shifted to a double writing process for writing the data to the flash memory 152 to complete the rebuild process early. Thus, the present embodiment carries out the destage process in advance to write as many recovered data to the drive 210 as possible. When the drive 210 becomes full to prevent further writes, the double writing process is carried out on the flash memory 152 to make the recovered data redundant early. Thus, the present embodiment can complete the rebuild process early with as many dirty data reduced as possible.

Embodiment 1

Figure 2:
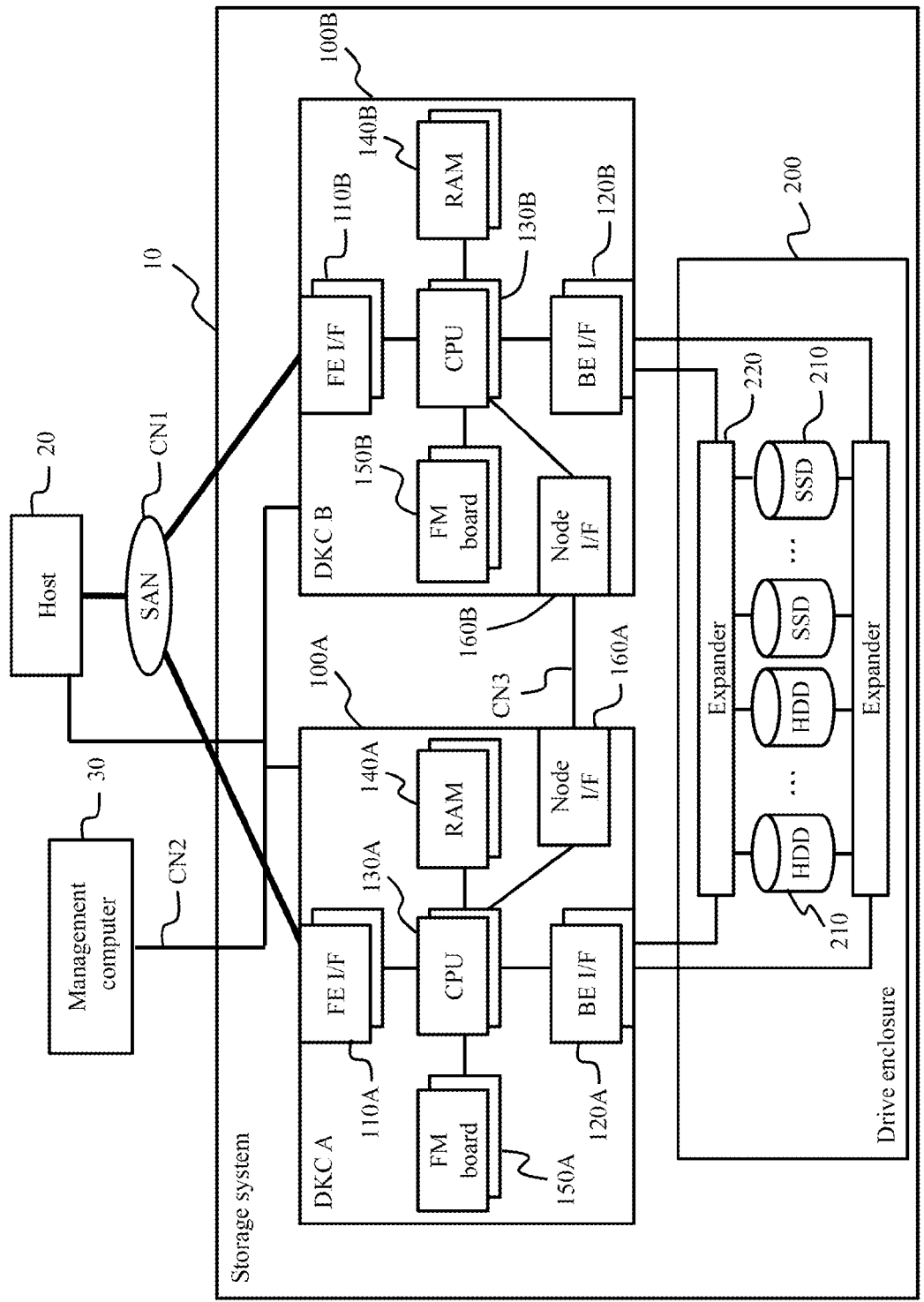
FIG. 2 is a diagram illustrating a general configuration of an information processing system including a storage system.

FIG. 2 is a diagram of a general configuration of the information processing system including the storage system 10. The information processing system includes, for example, the storage system 10, the host computer 20, and a management computer 30. The storage system 10 and the host computer 20 are coupled together via a first communication network CN1. The management computer 30 is coupled to the storage system 10 and the host computer 20 via a second communication network CN2.

The first communication network CN1 is a communication network through which I/O (Input/Output) data, commands, and the like flow and can be configured as, for example, an FC-SAN (Fibre Channel-Storage Area Network) or an IP-SAN (Internet Protocol-SAN). The second communication network CN2 is a network through which management information for managing the apparatuses 10 and 20 in the information processing system flows and can be configured as, for example, a LAN (Local Area Network). It should be noted that, instead of the first communication network CN1 and second communication network CN2 that are separated from each other, a single communication network may be used to perform data I/O and transmit and receive management information.

The storage system 10 includes a plurality of storage controllers 100A and 100B and a drive enclosure 200 accommodating a plurality of drives 210. The drive enclosure 200 couples the plurality of drives 210 together via a plurality of expanders 220. The drives 210 may be provided inside the storage controller 100 or in the enclosure 200 separate from the storage controller 100 as shown in FIG. 2. The drive 210 may a hard disk drive as described above or may be an SSD or the like.

A plurality of the drive enclosures 200 may be coupled to the storage controller 100. In that case, the plurality of drive enclosures 200 may be coupled directly to a plurality of ports of a back end interface 120, or the plurality of drive enclosures 200 may be coupled via a switch. Furthermore, the expanders 220 in the adjacent drive enclosures 200 may be cascaded to form a string of the drive enclosures 200.

The storage system 10 has a redundant configuration including a plurality of (two) storage controllers (in FIG. 2, DKC) 100A and 100B. An A-type configuration and a B-type configuration shown in FIG. 2 provide the storage system 10 with high availability. The storage controllers 100A and 100B are hereinafter referred to as the storage controller 100 or DKC 100 provided that the storage controller 100A and 100B are not particularly distinguished from each other.

The DKC 100 includes, for example, one or more front end interfaces 110, one or more back end interfaces 120, one or more microprocessors 130, a plurality of RAMs 140, a plurality of FM boards 150, and one or more node interfaces 160. Moreover, the DKC 100 includes a management interface (not shown in the drawings) for coupling to the management computer 30.

The front end interface (FE I/F) 110 controls communication with the host computer 20. The back end interface (BE I/F) 120 controls communication with each of the drives 210. The back end interface 120 is configured as, for example, an SAS (Serial Attached SCSI) or an FC (Fibre Channel). When the back end interface 120 is an SAS, the expander 220 is, for example, an SAS expander. When the back end interface 120 is an FC, the expander 220 is, for example, an FC switch.

The microprocessor (CPU) 130, which is an example of a "control apparatus", controls operation of the DKC 100. That is, the CPU 130 controls operation of the storage system 10. The RAM 140, serving as a "second memory apparatus", stores computer programs, management information, and the like. Moreover, a cache area for temporarily storing data is configured in a storage area in the RAM 140.

The FM board 150, serving as an example of a "first memory apparatus", has the flash memory 152 with a larger capacity than the RAM 140. As described below, the FM board 150 includes the FM board controller 151, serving as a control function to allow the flash memory 152 to be used. The FM board controller 151 includes the parity calculation circuit 1512.

The node interface 160 controls communication between the DKCs 110. A node interface 160A in one DKC 100A and a node interface 160B in the other DKC 100B are coupled together by an inter-controller communication path CN3. The inter-controller communication path CN3 may be a network interface such as Infiniband (trade mark), a fibre channel, or Ethernet (registered trade mark) or a bus interface such as PCI Express (trade mark). Each DKC 100 can communicate with the CPU 130 in the other DKC 100 or update the memory 140 or 150 in the other DKC 100, via the inter-controller communication path CN3.

For each single component shown in FIG. 2, a plurality of the components may be provided in view of redundancy, improved performance, or increased capacity. Furthermore, the components may be coupled together via an internal network. The network may include a switch and an expander.

Figure 3:
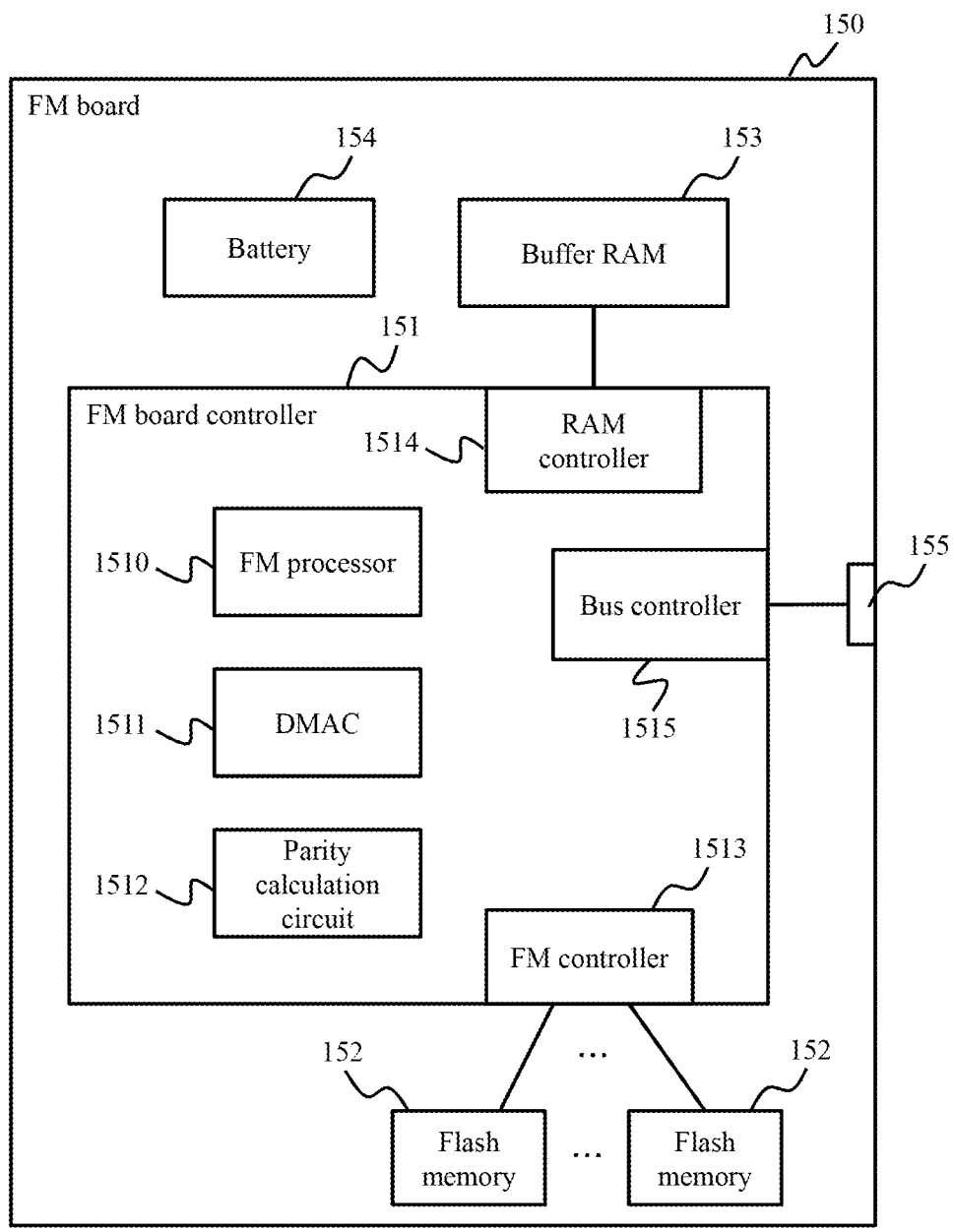
FIG. 3 is a block diagram showing a configuration of an FM (flash memory) board.

FIG. 3 shows an exemplary configuration of the FM (Flash Memory) board 150. The FM board 150 includes, for example, one or more FM board controllers 151, the flash memory (FM) 152, the buffer RAM 153, a battery 154, and a bus connector 155. The flash memory 152 is an example of a "first memory". The buffer RAM 153 is an example of a "buffer memory".

In the present embodiment, the flash memory 152 will be described as an example of the "first memory". However, the "first memory" is not limited to the flash memory 152 but may be another memory element, for example, a PCM (Phase Change Memory), an MRAM (Magnetoresistive Random Access Memory), or an ReRAM (Resistive Random-Access Memory).

The "first memory" has a larger capacity than the "buffer memory". Furthermore, to reduce the time needed for rebuild, the capacity is desirably sufficient to be able to hold all or most of the recovered data. Additionally, the "first memory" is desirably a nonvolatile memory.

The FM board controller 151 is configured as a hardware circuit, for example, an ASIC (Application Specific Integrated Circuit). The FM board controller 151 includes, for example, the FM processor 1510, a DMA (Direct Memory Access) controller 1511, the parity calculation circuit 1512, an FM controller 1513, a RAM controller 1514, and a bus controller 1515. According to the present embodiment, the single integrated circuit 151 incorporates the circuits 1510 to 1515. However, the circuits 1510 to 1515 may be mounted in a plurality of integrated circuits in a divided manner. Furthermore, any function of one circuit may be implemented by another circuit. For example, the parity calculation function of the parity calculation circuit 1512 may be implemented by the FM processor 1510.

The FM processor 1510 controls operation of the FM board controller 151. The DMA controller 1511 controls data transfer between the memories.

The parity calculation circuit 1512 carries out a predetermined parity calculation according to each RAID level (for example, exclusive OR (XOR) for RAID5). The FM controller 1513 controls data transfer to and from the plurality of flash memories 152. The RAM controller 1514 controls data transfer to and from the buffer RAM 153.

The buffer RAM (hereinafter also referred to as a buffer memory) 153 is a random access memory (RAM) such as a DRAM or an SRAM and is used as a buffer during data transfer. Furthermore, computer programs executed by the FM processor 1510 and data used by the FM processor 1510, the DMA controller (DMAC) 1511, or the like may be placed in the buffer memory 153.

The buffer memory 153 is used as a buffer during data transfer, and thus, the front end interface 110, the back end interface 120, the DMAC 1511, and the CPU 130 can write and read data to and from the buffer memory 153. Furthermore, the buffer memory 153 is desirably byte-accessible in order to hold various programs and control information.

The battery 154 supplies power to the buffer memory 153. The bus connector 155 is a connection terminal that couples the FM board 150 to a bus of the DKC 100. For example, if the FM board 150 is integrated with a main board of the DKC 100, the bus connector 155 may be omitted.

Figure 4:
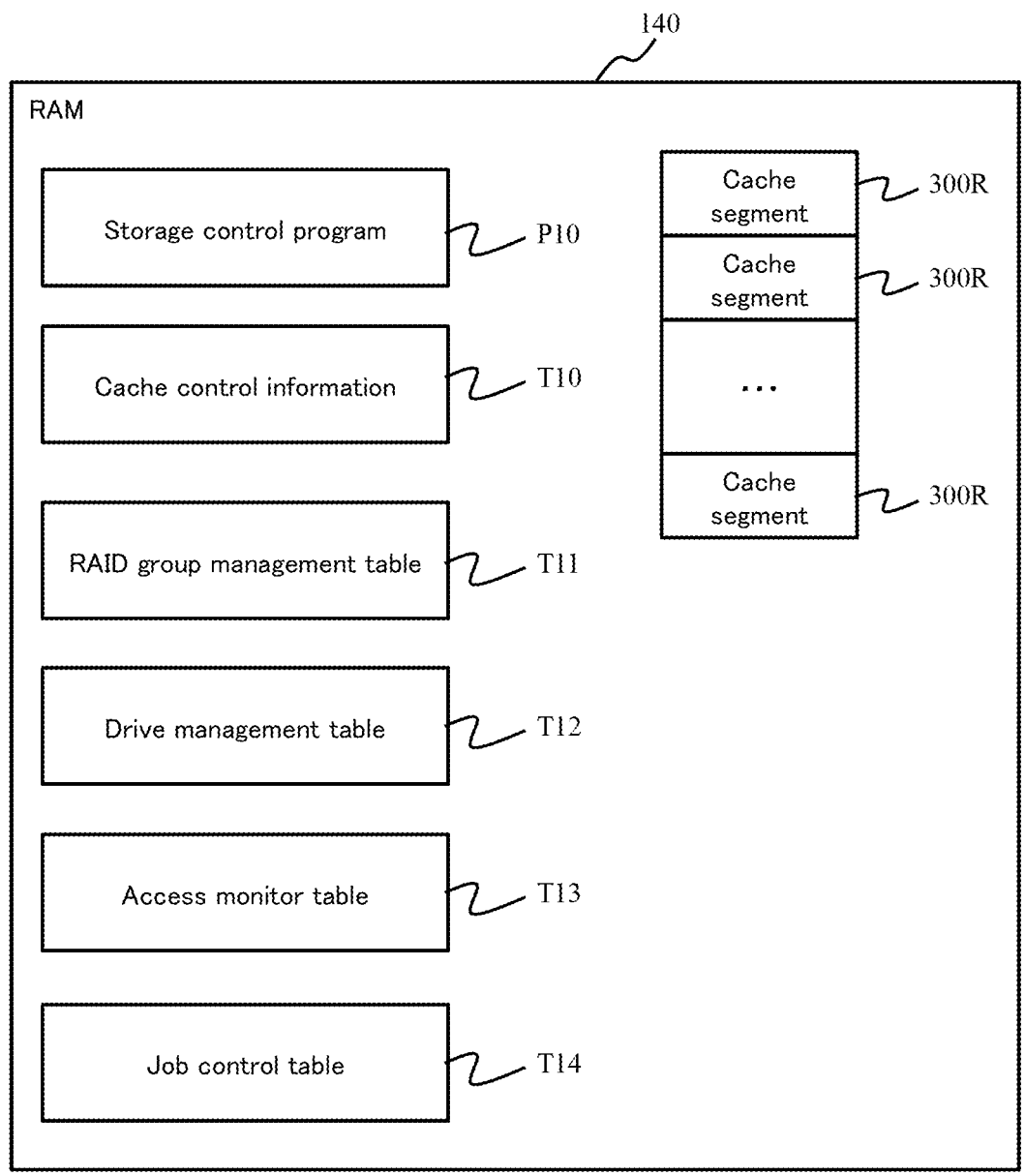
FIG. 4 is a diagram illustrating a storage configuration of a RAM.

FIG. 4 shows the contents of the RAM 140 in the DKC 100. The RAM 140 is a random access memory such as a DRAM or an SRAM.

The RAM 140 stores a computer program P10 and various management information or control information T10 to T14, and the other storage areas in the RAM 140 are configured to be cache areas.

The RAM 140 stores, for example, a storage control program P10 executed by the CPU 130, the cache control information T10, a RAID group management table T11, a drive management table T12, an access monitor table T13, and a job control table T14.

Moreover, the RAM 140 includes cache segments 300R for caching data, and the cache segments 300R can cache data read from the drive 210, or data received from the host computer 20, or a parity created by the storage system 10.

The cache control information T10 includes at least a cache directory, a clean queue, a dirty queue, an FM free queue, and a RAM free queue. The data structure of each of the directory and queues will be described below.

The RAM 140 can be configured as a memory module such as a DIMM (Dual Inline Memory Module) with a plurality memory of chips mounted on a printed circuit board. The DIMM is coupled to a memory slot on the main board of the DKC 100. The RAM 140 may be mounted on a board different from the main board of the DKC 100. In this case, a maintenance and replacement operation may be performed on the RAM or the capacity of the RAM 140 may be increased, independently of the main board.

FIG. 5 shows exemplary data structures of the RAID group management table T11 and the drive management table T12.

The RAID group management table T11 shown in FIG. 5 (a) manages the configuration of the RAID group 230. The RAID group management table T11 manages, for example, a RAID group number C110, a RAID level C111, the number of drives C112, and a drive number C113 in association with one another.

The RAID group number C110 is identification information for uniquely identifying the RAID group 230 within the storage system 10. The RAID level C111 is indicative of the RAID level of the RAID group 230. The number of drives C112 is indicative of the number of drives (drives 210) forming the RAID group 230. The drive number C113 is identification information identifying each of the drives forming the RAID group 230. When the number of drives 210 forming a certain RAID group 230 is smaller than an upper limit value n for the number of drives, an empty field is considered to be invalid.

A drive management table T12 shown in FIG. 5 (b) manages the drive 210. The drive management table T12 manages, for example, a drive number C120, a drive status C121, a spare number C122, and a rebuild progress position C123.

The drive number C120 is identification information for identifying each of the drives 210 within the storage system 10. The drive status C121 is indicative of the status of the drive 210. The drive status may be, for example, "normal", "failed", "spare", and "unassigned".

"Normal" indicates that the drive 210 has been incorporated into the RAID group 230 and is normal. "Failed" indicates that the drive 210 is failed. When the drive 210 with the failed status is assigned with a spare drive, the drive number of the spare drive is stored in a "spare number" field.

"Spare" indicates that the drive 210 has been assigned as a spare drive for another drive. In this case, information indicating how far a rebuild process on the spare drive has been completed is stored at the rebuild progress position C123. The rebuild progress position C123 has an initial value of 0. The CPU 130 carries out a rebuild process in order starting with the head of the drive, and each time a rebuild progress position C123 is executed, adds the length of data recovered by the rebuild process. "Unassigned" indicates that the drive 210 has not been incorporated into any RAID group 230 and is not used as a spare drive.

Figure 6:
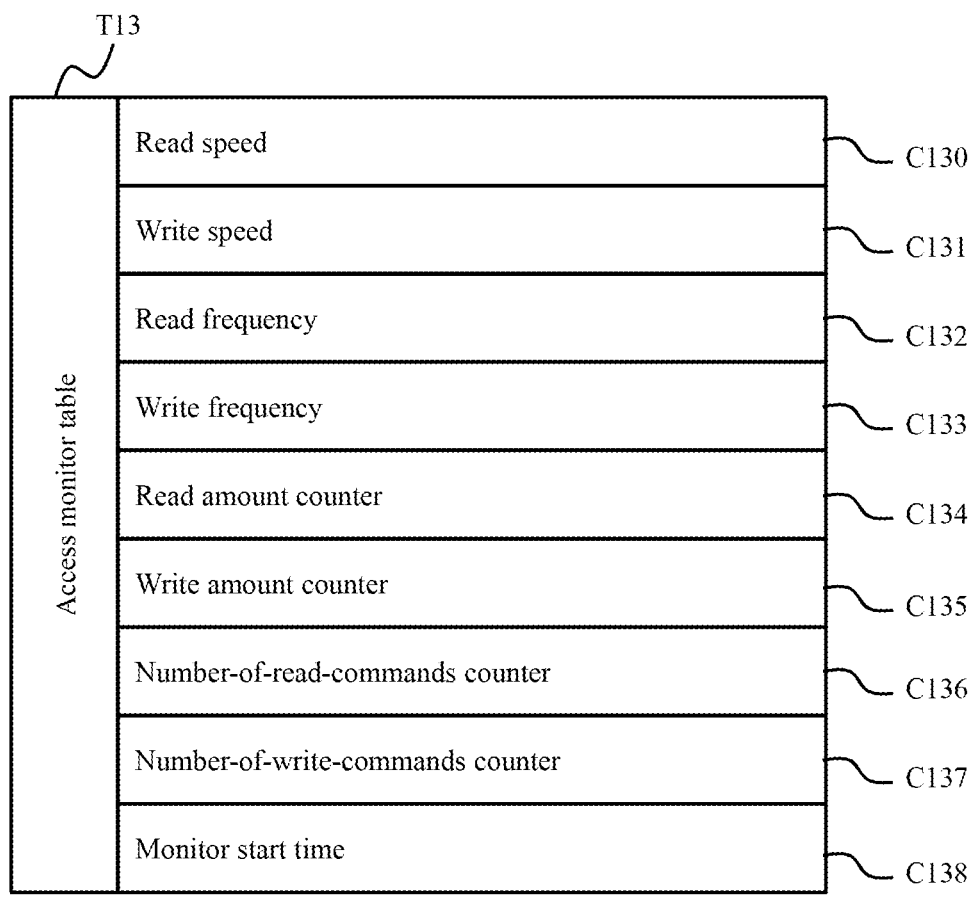
FIG. 6 shows an exemplary configuration of a table for monitoring accesses.

FIG. 6 shows an exemplary data structure of the access monitor table T13. The access monitor table T13 manages the access status of each partial area in a logical volume.

Physical storage areas of the respective plurality of drives 210 are collectively virtualized as the RAID group 230 by the DKC 100. A logical storage area of a predetermined size or a variable size can be configured for the virtualized physical storage area. The logical storage area is hereinafter referred to as a logical device (or logical volume or logical unit). The storage area in the logical volume is divided into a plurality of partial areas that are monitored for an access status.

The access monitor table T13 is provided for each partial area to be monitored. The access monitor table T13 includes, for example, a read speed C130, a write speed C131, a read frequency C132, a write frequency C133, a read amount (number-of-bytes) counter C134, a write amount (number-of-bytes) counter C135, a number-of-read-commands counter C136, a number-of-write-commands counter C137, and a monitor start time C138.

The unit of the read speed C130 and the write speed C131 is, for example, MB/sec. The unit of the read frequency C132 and the write frequency C133 is, for example, IOPS (Input/Output Per Second).

The read amount counter C134, the write amount counter C135, the number-of-read-commands counter C136, and the number-of-write-commands counter C137 are totaling counters. The read speed C130, the write speed C131, the read frequency C132, and the write frequency C133 store the results of totaling.

Figure 7:
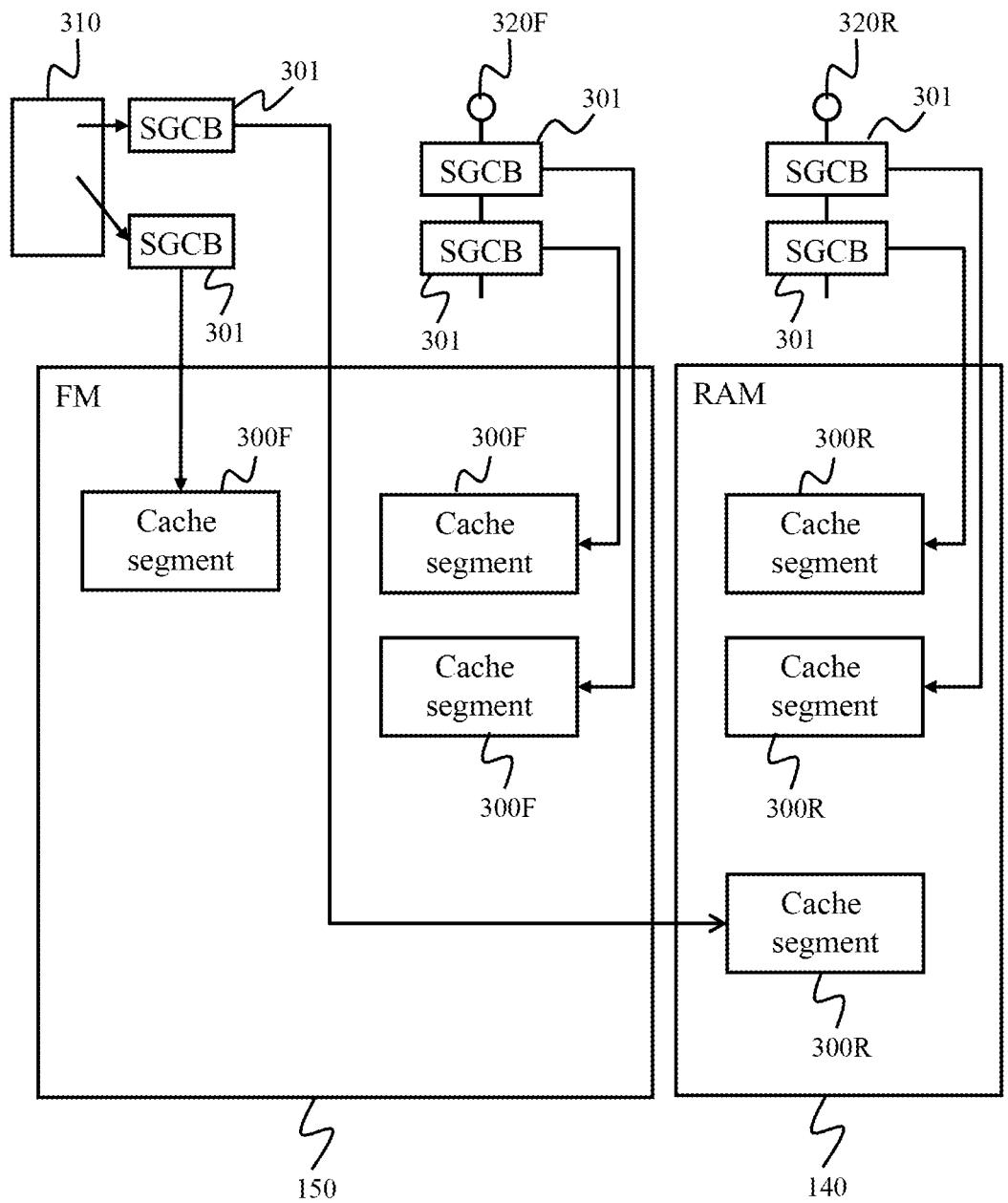
FIG. 7 is a diagram illustrating how cache segments are managed.

FIG. 7 is a conceptual diagram of the data structure for managing the cache segments. A more specific data structure will be described below.

The data structure for managing the cache segments includes, for example, a cache directory 310, an FM free queue 320F, and a RAM free queue 320R. When cache segments 300F in the flash memory 152 in the FM board 150 are not distinguished from the cache segments 300R in the RAM 140, the cache segments 300F and the cache segments 300R are referred to as the cache segments 300.

One FM board 150 as a whole forms a memory apparatus, and the flash memory 152, included in the FM board 150, is only a memory element. Predetermined control is needed to allow the flash memory 152 to function as a memory. Thus, the FM (Flash Memory) hereinafter sometimes represents the FM board 150. Thus, the FM board is hereinafter sometimes described as the FM 150.

The cache segments 300 are managed by a management table 301 called an SGCB (SeGment Control Block). The SGCB 301 corresponds one-to-one with a management target cache segment 300.

The cache directory 310 is a data structure that manages the correspondence relations between the logical addresses of cache target data and the physical addresses on the memory. The cache directory 310 is a hash table using the logical address of the cache target data as a key, and has SGCBs 301 as entries.

The FM free queue 320F is control information for managing free segments of the cache segments in the FM 150. The free segments are segments in which no data is stored. The FM free queue 320F includes, for example, a doubly linked list with SGCBs 301 as entries. The FM free queue 320F need not necessarily be a queue but may be a data structure such as a stack.

The RAM free queue 320R is control information for managing the free segments in the RAM 140.

The SGCB 301 is coupled to the cache directory 310 or one of the FM free queue 320F and the RAM free queue 320R depending on the status and type of the corresponding cache segment.

The SGCB 301 managing each cache segment 300F in the FM 150 is, while the segment 300F is unused, coupled to the FM free queue 320F. When the cache segment 300F is assigned for data storage, the SGCB 301 is coupled to the cache directory 310.

The SGCB 301 managing each cache segment 300R in the RAM 140 is, while the segment 300R is unused, coupled to the RAM free queue 320R. When the cache segment 300R is assigned for data storage, the SGCB 301 is coupled to the cache directory 310.

Figure 8:
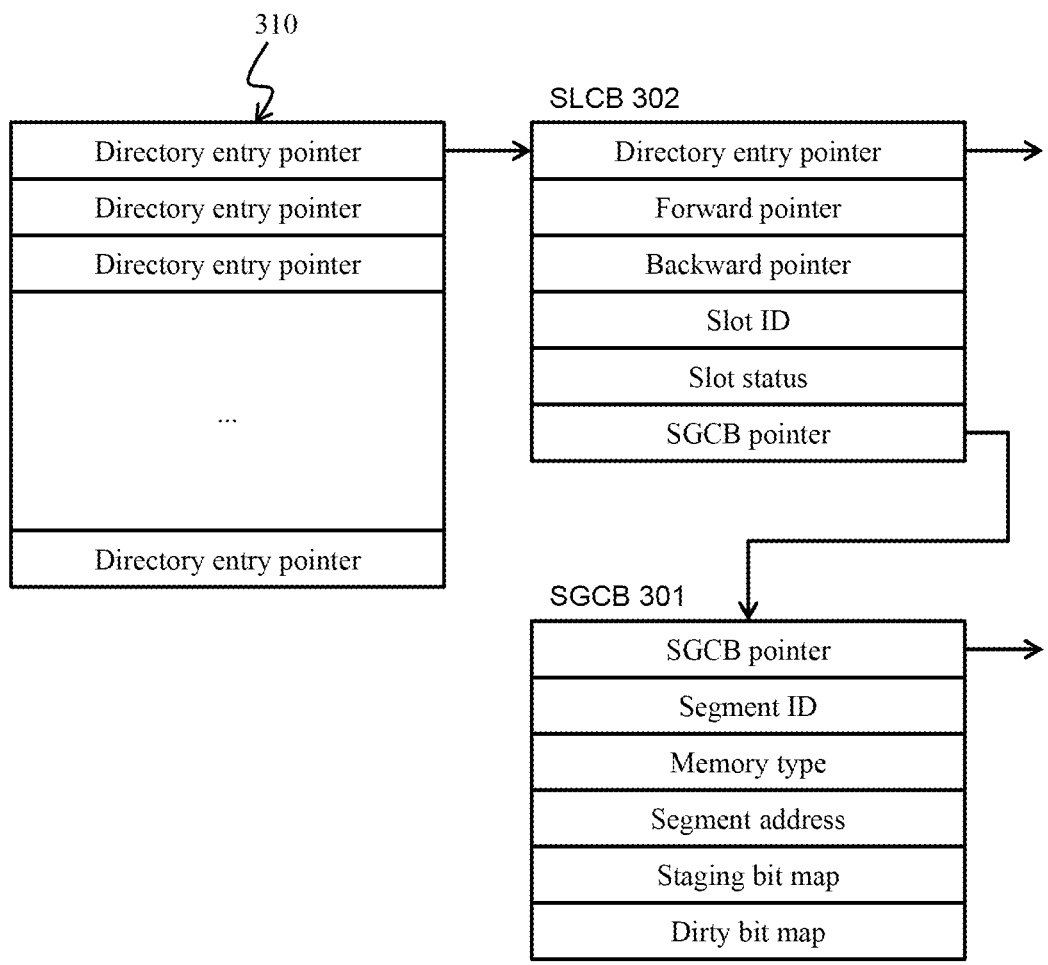
FIG. 8 is a diagram illustrating how a cache directory is managed.

FIG. 8 shows the data structure of the cache directory 310. The cache directory 310 is, for example, a hash table using a slot ID (identifier) as a key. An SLCB 302 that is an entry in the hash table includes a directory entry pointer pointing to the next entry in the hash table, a forward pointer and a backward pointer used for queue coupling described below, a slot ID, a slot status, and an SGCB pointer. A segment included in the slot is managed by, for example, an SGCB linked list, and the SGCB pointer points to the leading SGCB in the list.

The SGCB 301 includes an SGCB pointer pointing to the next SGCB, a segment ID, a memory type (FM or RAM), a segment address, a staging bit map, and a dirty bit map.

The staging bit map is indicative of locations in the segment 300 where clean data, that is, data matching the data stored in the drive 210, is cached. In the staging bit map, ON (1) is configured for a bit corresponding to each block in which valid data is cached, and OFF (0) is configured for a bit corresponding to each of the other blocks.

Similarly, the dirty bit map is indicative of locations in the segment 300 where dirty data, that is, data failing to match the data stored in the drive 210 (data not written to the drive 210 yet), is cached.

Figure 9:
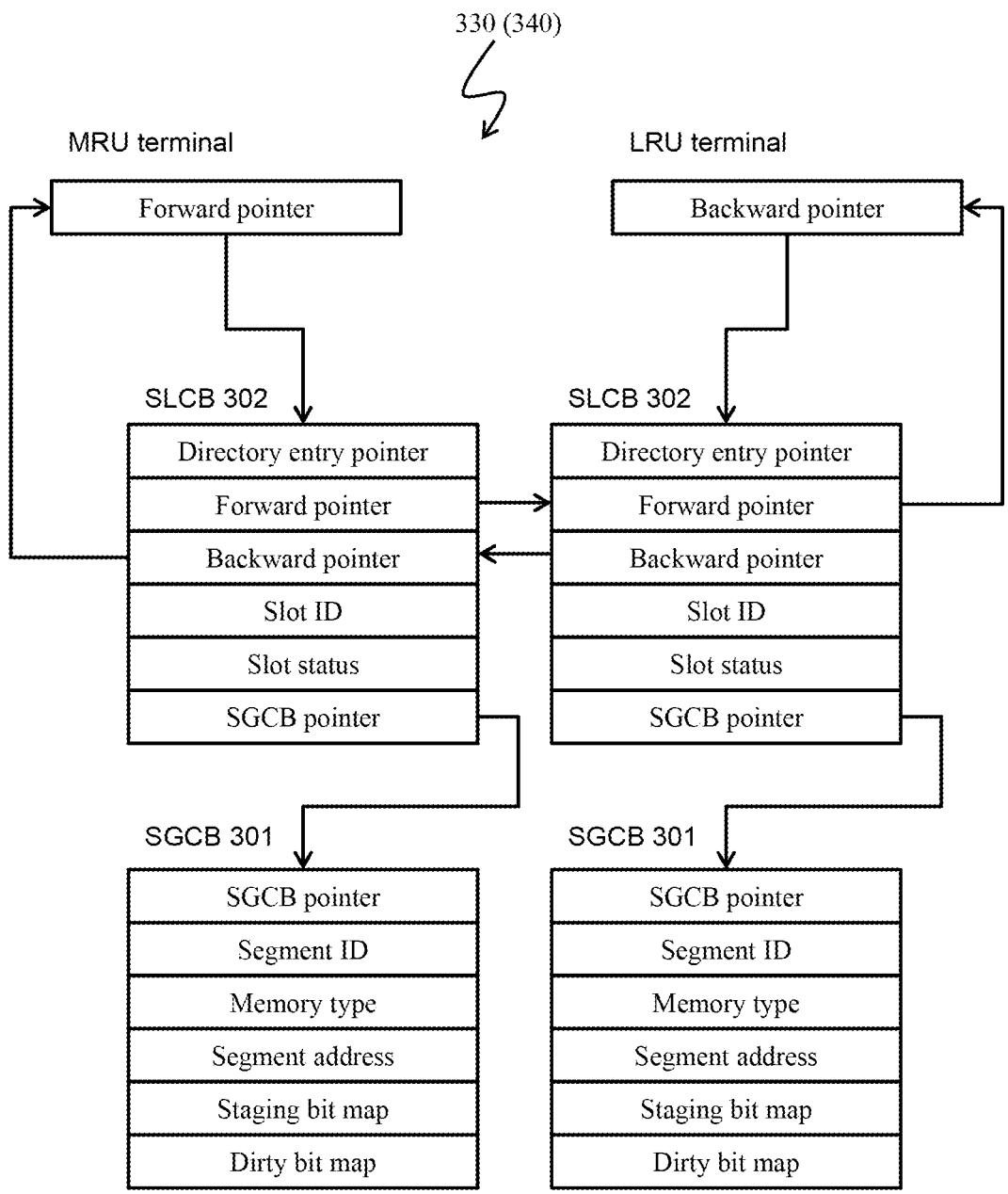
FIG. 9 is a diagram illustrating a method for managing a dirty queue and a clean queue.

FIG. 9 shows the data structure of a dirty queue or a clean queue. Both the dirty queue and the clean queue couple to the SLCB (slot control block) 302. The SLCB 302 for a slot containing dirty data is coupled to the dirty queue, and the SLCB 302 for a slot containing only clean data is coupled to the clean queue.

The dirty queue and the clean queue are used for cache replacement, destage scheduling, and the like, and may have structures depending on a cache replace algorithm, a destage scheduling scheme, and the like.

According to the present embodiment, an LRU (Least Recently Used) algorithm is used for cache replacement and destage scheduling. Each queue is configured as a doubly linked list in which SLCBs are linked together via the forward pointers and the backward pointers with respect to an MRU (Most Recently Used) terminal and an LRU terminal. In each queue, the SLCBs 302 are arranged in a reverse chronological order in terms of final use time from the MRU terminal side.

Figure 10:
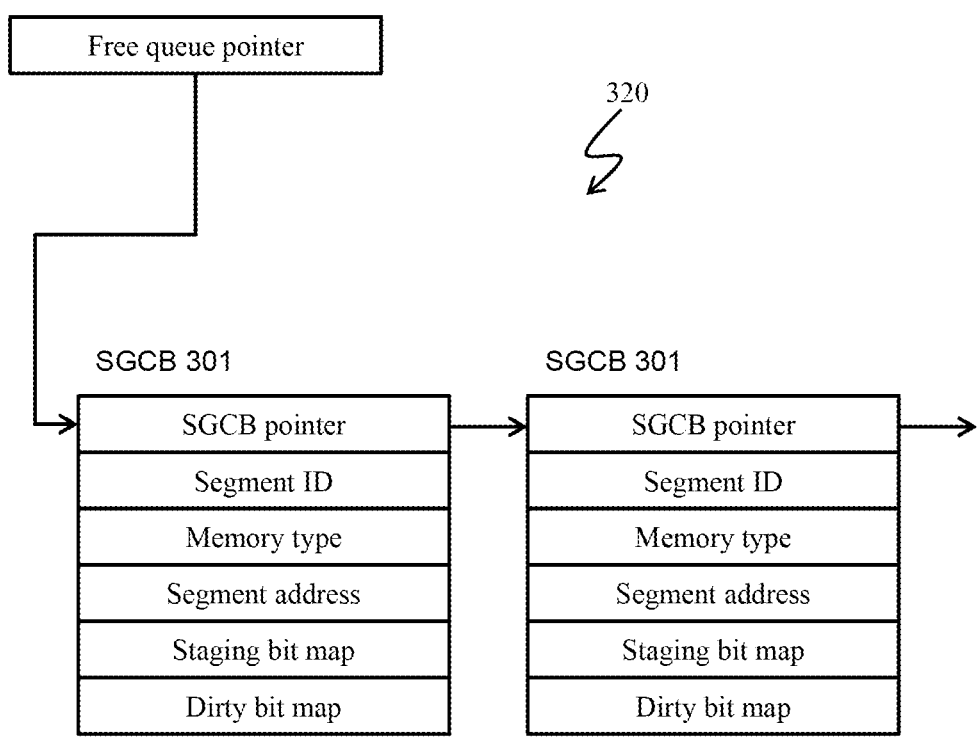
FIG. 10 is a diagram illustrating a method for managing a free queue.

FIG. 10 shows the data structure of the FM free queue 320F or the RAM free queue 320R. The FM free queue 320F and the RAM free queue 320R are sometimes referred to as a free queue 320 without being distinguished from each other.

The free queue 320 is a queue in which the SGCBs 301 for segments unused are coupled together. The SGCBs 301 for segments unused 300F of the segments 300F in the FM 150 are coupled to the FM free queue 320F. The SGCBs 301 for segments unused 300R of the segments 300R in the RAM 140 are coupled to the RAM free queue 320R. The segments unused are hereinafter sometimes referred to as free segments.

According to the present embodiment, the free queue 320 is a linked list in which the SGCBs 301 are coupled together via the pointers. A free queue pointer is a pointer pointing to the leading SGCB 301 in the queue.

FIG. 11 shows the FM address mapping table T15. The FM address mapping table T15 is a table indicative of the correspondences between logical addresses (LBAs) C150 in a logical volume and physical addresses C151 in the FM board 150.

In this example, chip numbers C1510 for the flash memory, block numbers C1511, page numbers C1512, and offsets C1513 in the page are stored as the physical addresses C151 in the FM board 150.

Now, flows of data in parity generation and data recovery according to the present embodiment will be described with reference to FIG. 12 to FIG. 15. When a process for parity creation or data recovery is carried out in the FM board 150, if all data needed for the parity creation or data recovery is stored in the single FM board 150, data transfer between FM boards is unnecessary and the process can be efficiently achieved. Thus, the FM board to which the cache segment is assigned is selected so as to cache as many data of the series of data needed for the parity creation or data recovery in one FM board as possible.

The CPU 130 managerially checks where each data is cached using the cache control information T10. More specifically, address information on the cache segment in which each data is cached is stored in a segment ID in the SGCB 301.

Figure 12:
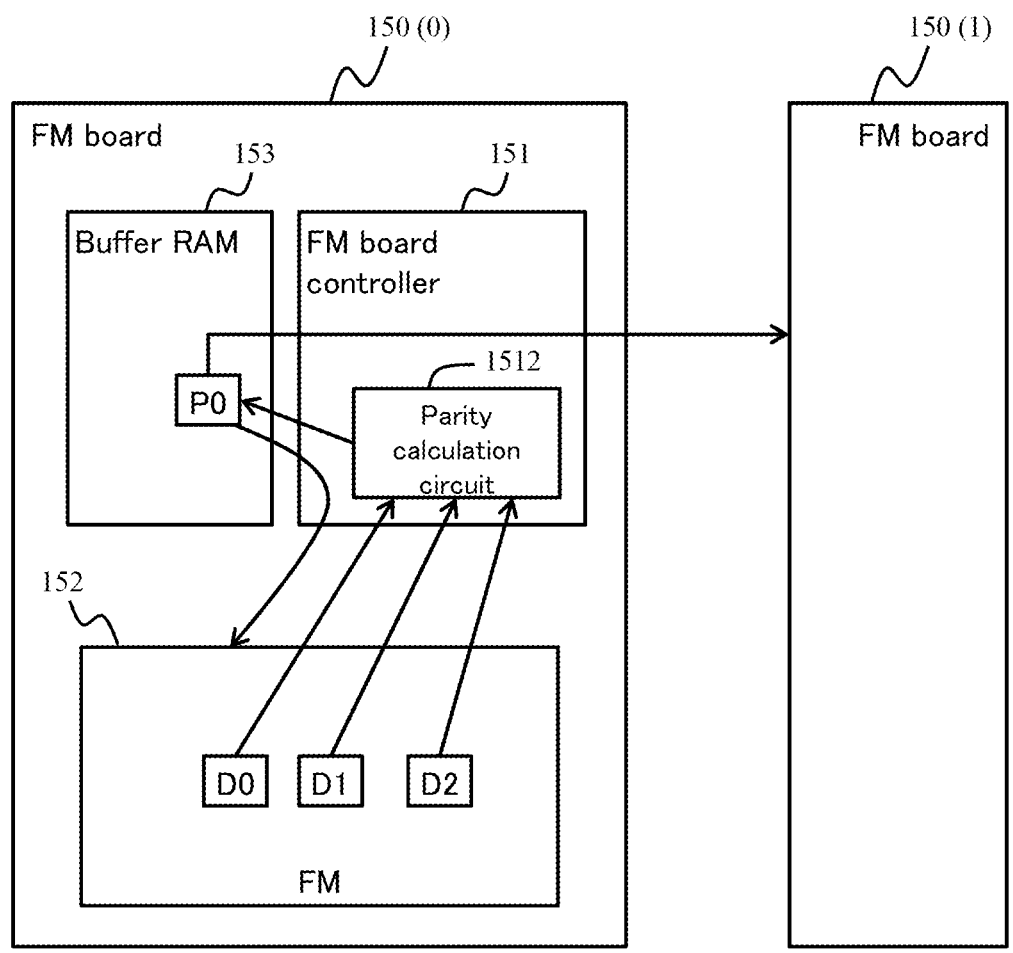
FIG. 12 is a diagram illustrating how a parity is created.

FIG. 12 shows how a parity is created in the FM board 150. In the example in FIG. 12, all data D0, D1, and D2 in a stripe column are stored in the flash memory 152, and the parity calculation circuit 1512 calculates a parity P0 using the data D0, D1, and D2.

FIG. 12 will be described taking RAID5 (3D+1P) as an example. In FIG. 12, all the data D0, D1, and D2 are stored in the cache in the flash memory 152. In this state, the data D0 to D2 are read into the parity calculation circuit 1512 in order, and exclusive OR (XOR) is performed on the data D0 to D2.

The result of the calculation P0 by the parity calculation circuit 1512 is stored in the buffer memory 153 in the FM board 150. The result of the calculation P0 is a new parity created from the data D0 to D2.

The new parity P0 is stored in the flash memory 152 in the FM board 150 having carried out a parity calculation, and is copied to the flash memory 152 in another FM board 150. Writing the same data (or parity) to the flash memories 152 in the plurality of different FM boards 150 is referred to as FM dual writing in the present embodiment.

The new parity may be stored in yet another FM board or in the cache area in the RAM 140. This also applies to the description of data flows below.

Figure 13:
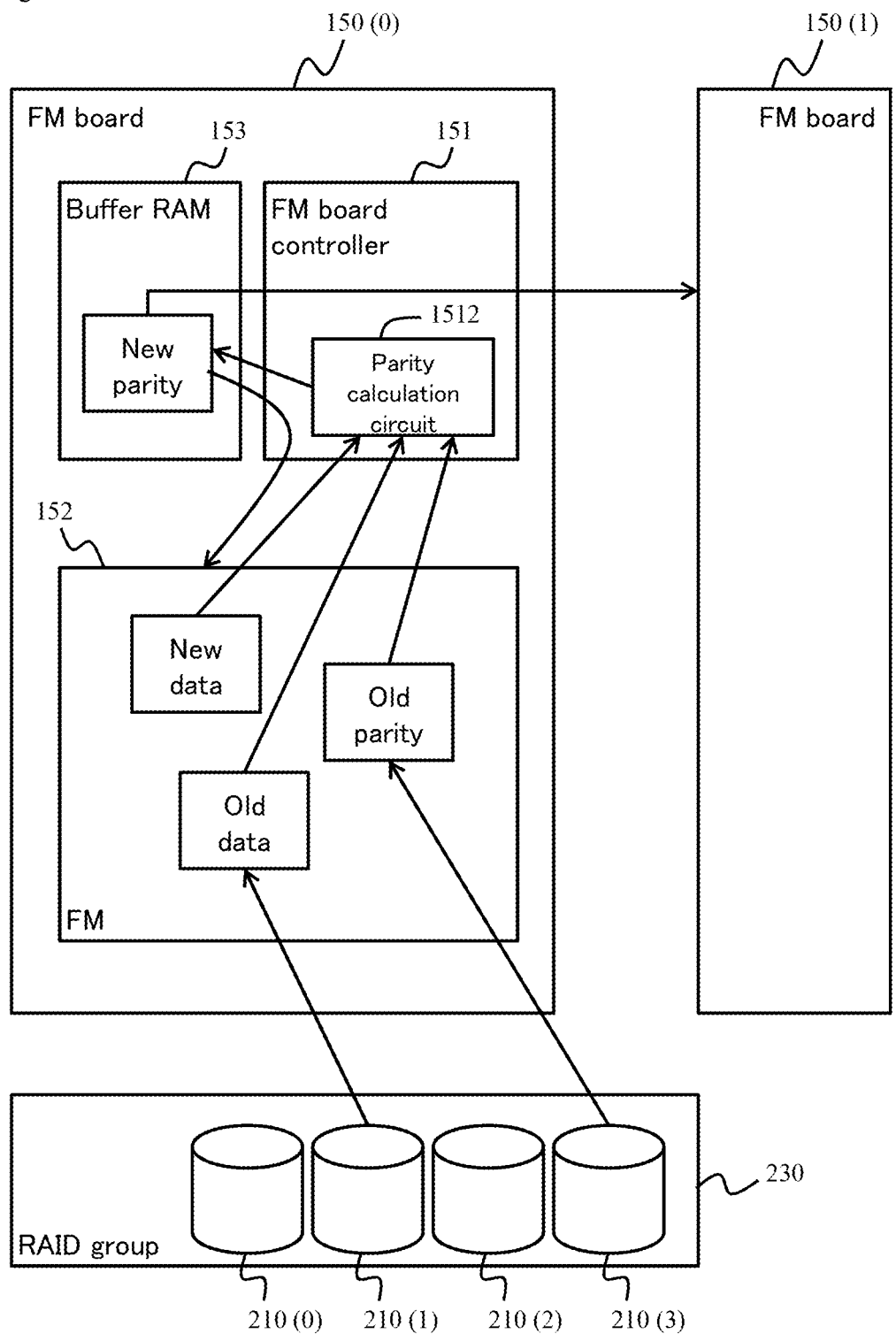
FIG. 13 is a diagram illustrating how a new parity is created during a write process.

FIG. 13 shows a data flow of a parity creation process using new data, old data, and an old parity. In this case, the new data, the old data, and the old parity are read into the parity calculation circuit (in random order), and an exclusive OR (XOR) calculation is carried out on the data and parity to calculate a new parity.

The new parity is stored in the buffer memory 153. The new parity is stored in the flash memory 152 in the FM board 150(0) and is copied to and stored in another FM board 150(1) (FM dual writing).

Figure 14:
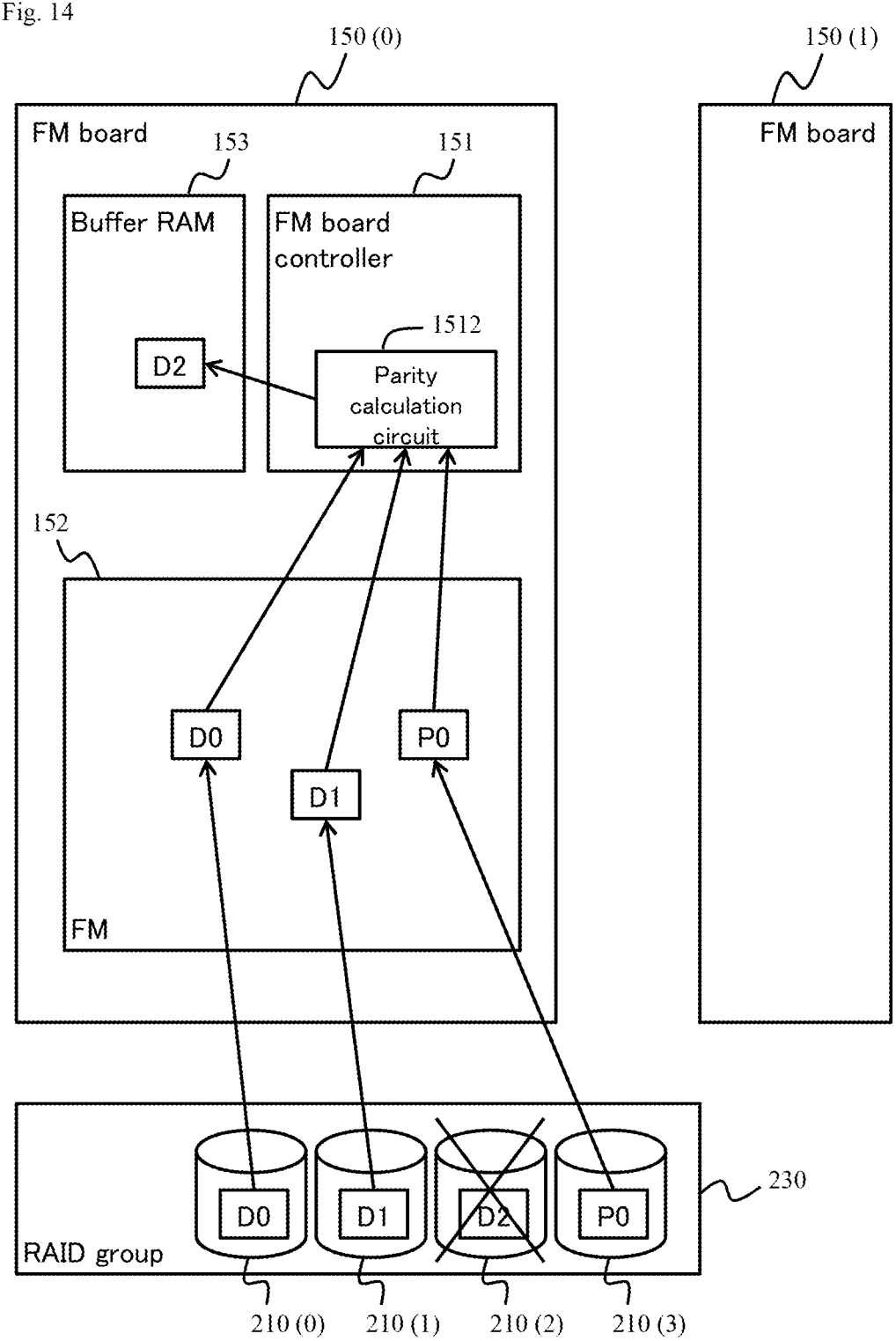
FIG. 14 is a diagram illustrating how data is recovered.

FIG. 14 shows a data flow of a data recovery process (rebuild process) carried out when a certain drive 210(2) in the RAID group 230 fails. In this example, the data D2 included in a certain stripe is recovered from the remaining data D0 and D1 and parity P0 included in the stripe.

The CPU 130 references the drive management table T12 to acquire the number of the failing drive 210. The CPU 130 then references the RAID group management table T11 to acquire the RAID level of the RAID group including the drive 210 and the number of the drive forming the RAID group.

The parity calculation circuit 1512 reads the data D0 and D1 and the parity P0 on the cache, carries out exclusive OR on the data D0 and D1 and the parity P0, and stores the result of the calculation in the buffer memory 153. The result of the calculation corresponds to recovered data D2. A process for writing the recovered data D2 to the drive 210 will be described below.

Figure 15:
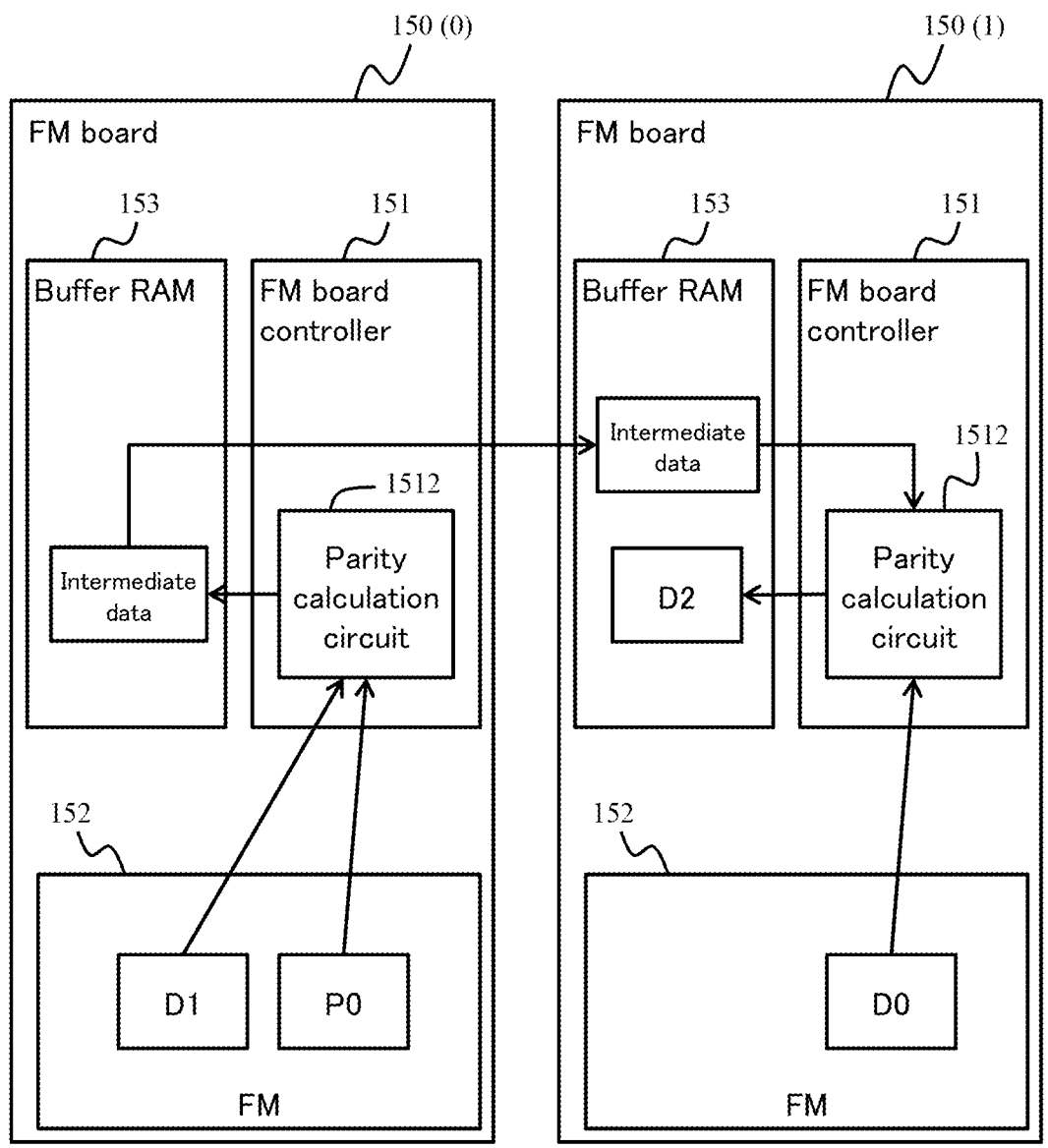
FIG. 15 is a diagram illustrating how a plurality of FM boards cooperates with one another in recovering data.

FIG. 15 shows a data flow of a data recovery process across packages. The across packages as used herein means that the process relates to different FM boards 150. The package means a board. FIG. 15 shows how the different FM boards 150 cooperate with one another in recovering data. For the elements of a first FM board 150(0), (0) is appended to the reference sign. For the elements of a second FM board 150(1), (1) is appended to the reference sign.

FIG. 15 shows that the data D0 and D1 and parity P0 needed for data recovery are stored in the different FM boards 150. In FIG. 15, the data D1 and the parity P0 are stored in the first FM board 150(0), and the data D0, the remaining data belonging to the same stripe, is stored in the second FM board 150(1).

In this state, when the data D2 is recovered, a first parity calculation circuit 1512(0) reads the data D1 and the parity P0 from the first FM board 150(0) and carries out a parity calculation on the data D1 and the parity P0. The result of the calculation by the parity calculation circuit 1512(0) is stored in a first memory 153(0) as intermediate data.

The intermediate data stored in the first buffer memory 153(0) is transferred to the buffer memory 153(1) in the second FM board 150(1). A second parity calculation circuit 1512(1) reads the intermediate data received from the first FM board 150(0) and the data D0 in the second FM board 150(1) and carries out a parity calculation on the intermediate data and the data D0. Thus, the second parity calculation circuit 1512(1) recovers the data D2 from the intermediate data and the data D0. The recovered data D2 is stored in the second buffer memory 153(1). Subsequently, the recovered data D2 is written to the FM boards 150(0) and 150(1) or to the drive 210 via the RAM 140. This will be described below.

The CPU 130 references the segment amount management table T16 in the RAM 140 shown in FIG. 33. Then, upon determining that the proportion of dirty segments to all the segments in the RAM 140 is equal to or more than a predetermined value, the CPU 130 writes the recovered data to the FM board 150. Upon determining that the proportion of dirty segments to all the segments in the RAM 140 is less than the predetermined value, the CPU 130 writes the recovered data to the drive 210 via the RAM 140. In this case, as shown in FIG. 33, the segment amount management table T16 manages the number of segments for each segment status. The segment status includes a clean segment, a dirty segment, a free segment, a dirty segment for rebuild. The segment amount management table T16 also manages the number of all the segments.

Figure 16:
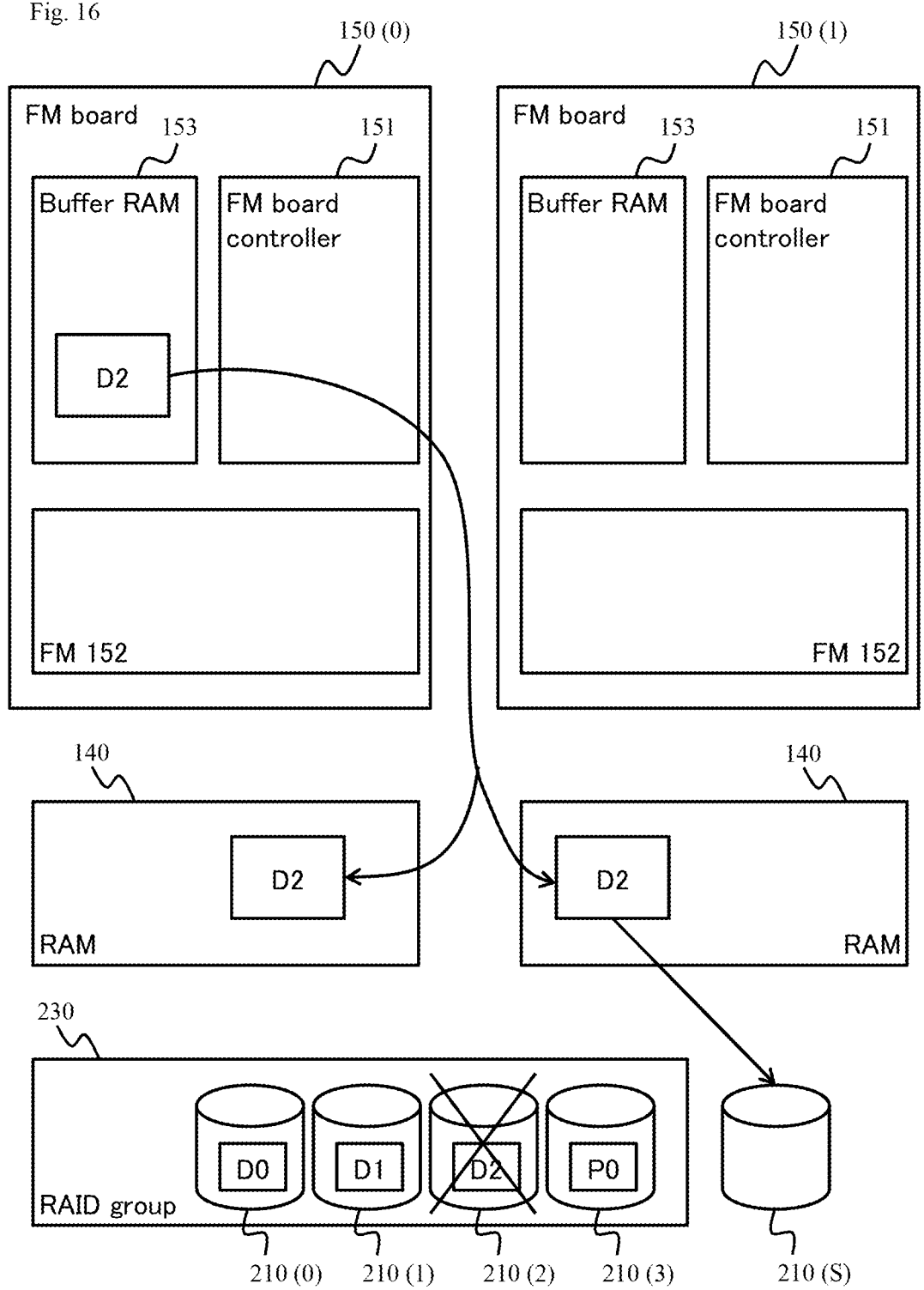
FIG. 16 is a diagram illustrating how recovered data is destaged.

FIG. 16 shows a data flow of a destage process carried out on the recovered data (a destage process via the RAM 140).

The recovered data D2 is temporarily stored in the RAM 140. For improved reliability, the recovered data D2 may be separately stored in a plurality of (two) different RAMs 140. Writing the same data to the different RAMs 140 is hereinafter referred to as RAM dual writing. Subsequently, the recovered data D2 is written to the spare drive 210(S).

Figure 17:
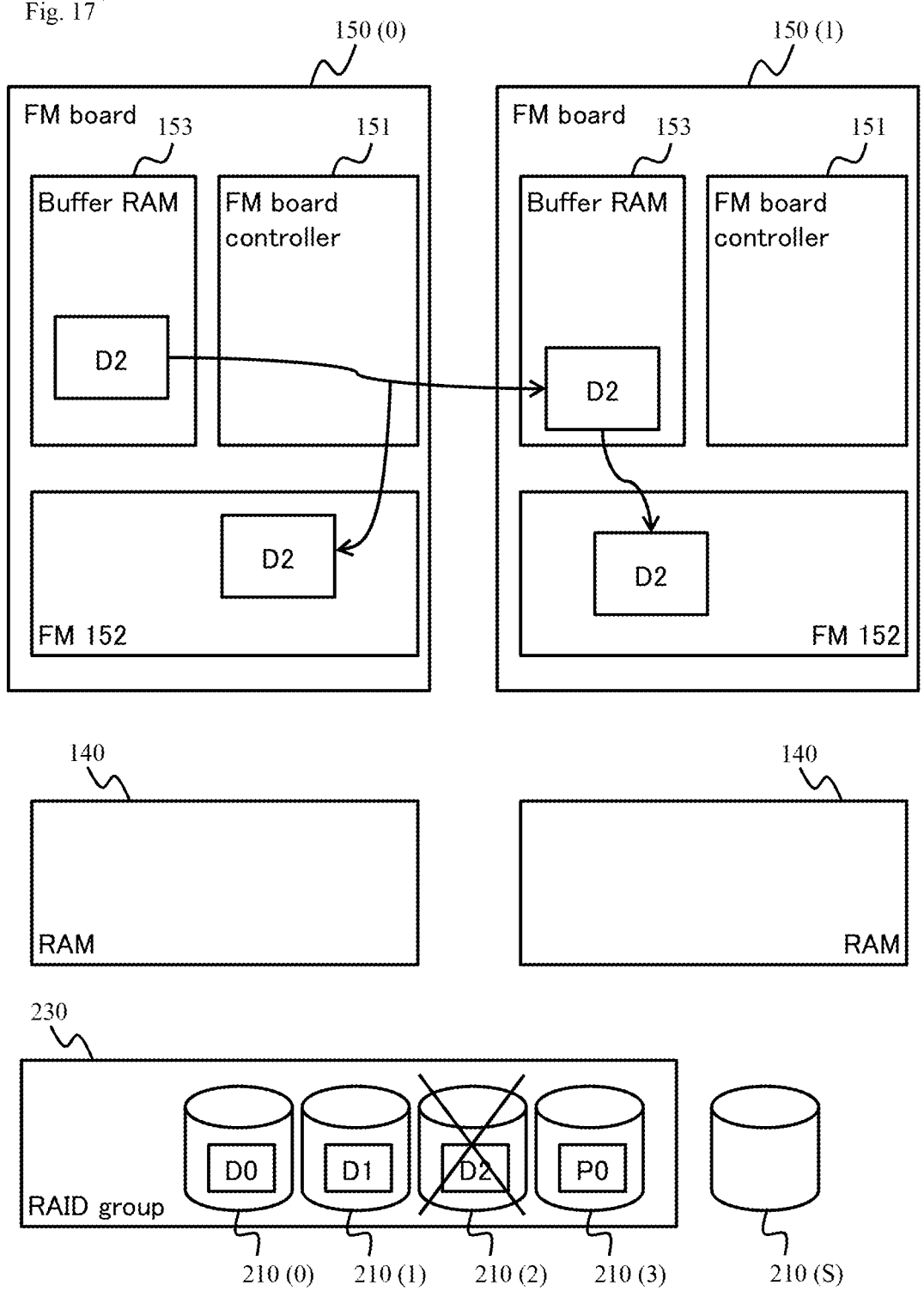
FIG. 17 is a diagram illustrating how recovered data is written to a plurality of flash memories.

FIG. 17 shows a data flow in which the recovered data is stored in a plurality of FM boards 150. FIG. 17 differs from FIG. 16 in that the recovery D2 is not cached in the RAM 140 but in the flash memory 152 in the FM board 150. An example illustrated in FIG. 17 uses the large-capacity flash memory 152 as the storage destination of the recovered data to allow more recovered data to be cached than a case where the recovered data is stored in the RAM 140.

After all the recovered data corresponding to the data in the failing drive 210(2) is stored in the spare drive 210(S) or the FM board 150, the data in the RAID group 230 recovers redundancy. Thus, even if another drive in the RAID group 230 subsequently breaks down, the corresponding data is prevented from being lost.

When the storage system 10 has a large scale, the speed of a rebuild process is often controlled by the speed at which write is carried out on the spare drive 210(S). In general, storage systems for enterprises are configured to have performance better than performance needed for normal host I/Os. On the other hand, the rebuild process is desirably carried out as fast as possible regardless of the host I/O performance. This is because the time needed for the rebuild impacts the reliability of the system. Thus, eliminating a bottleneck to the spare drive 210(S) during the rebuild is important.

Thus, when, first, a part or all of the recovered data is written to the cache (FM cache) in the high-speed FM board 150, the redundancy of the data can be recovered fast. As a result, the possibility that data is lost by a double failure among the drives can be reduced to improve the reliability of the storage system 10. The recovered data D2 written to both of the different FM boards 150 is subsequently written to the spare drive 210(S).

Figure 18:
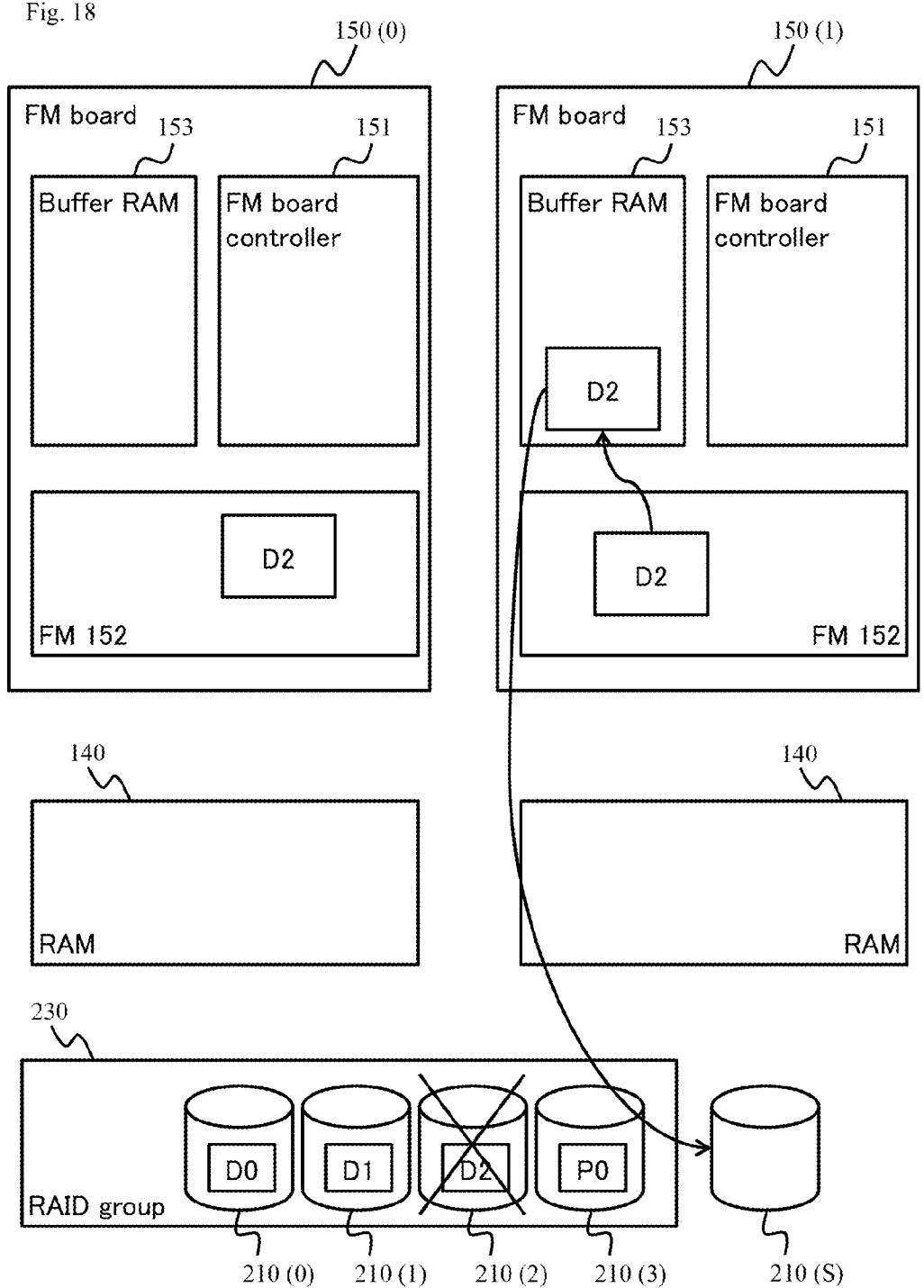
FIG. 18 is a diagram illustrating how a destage process is carried out in which data is written from a flash memory to a reserved storage apparatus.

Specifically, as shown in FIG. 18, one of the data written to the two different FM boards 150 is read from the flash memory 152 into the buffer RAM 153 and then written to the spare drive 210(S).

The process of write from the FM board 150 to the spare drive 210(S) may be carried out in a delayed manner and thus asynchronously with a parity calculation process. For example, after data corresponding to the data in the failing drive 210(2) is stored in the FM board 150 or the RAM 140 or the spare drive 210(S), write from the FM board 150 to the spare drive 210(S) is started.

That is, during data recovery, write from the FM board 150 to the spare drive 210(S) is not carried out, and the data is accumulated in the FM board 150. Thus, the bandwidth of the spare drive 210(S) can be occupied by the destage process via the RAM 140, improving the throughput of the destage process via the RAM 140. This reduces the total amount of data destaged via the FM board 150. That is, the amount of data written to the flash memory decreases to extend the lifetime of the FM board 150. Furthermore, the RAM has a wider band than the flash memory, and thus, increasing the rate of the destage via the RAM 140 is more advantageous in terms of performance.

Figure 19:
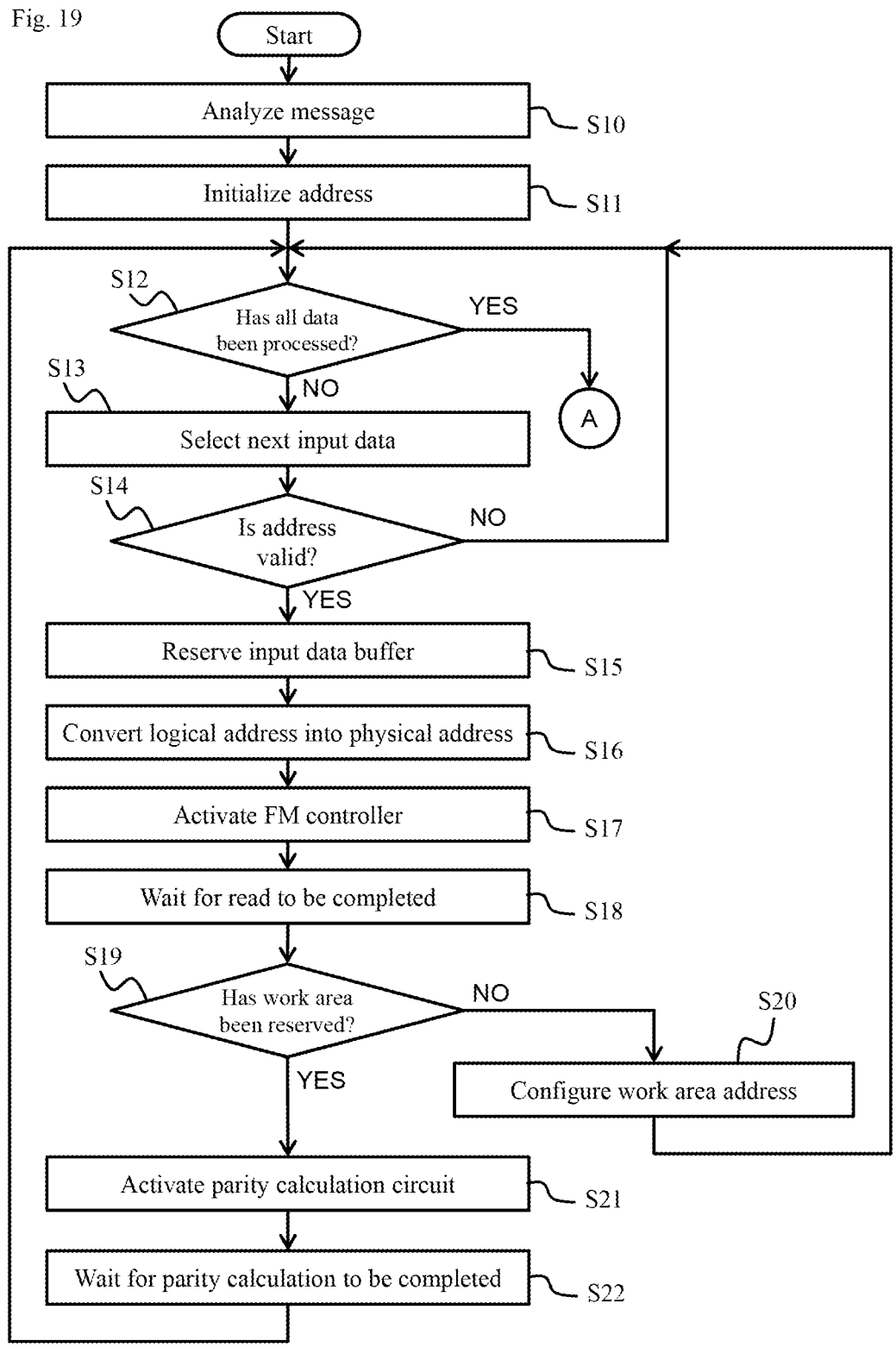
FIG. 19 is a flowchart showing a parity calculation process executed by an FM processor.
Figure 20:
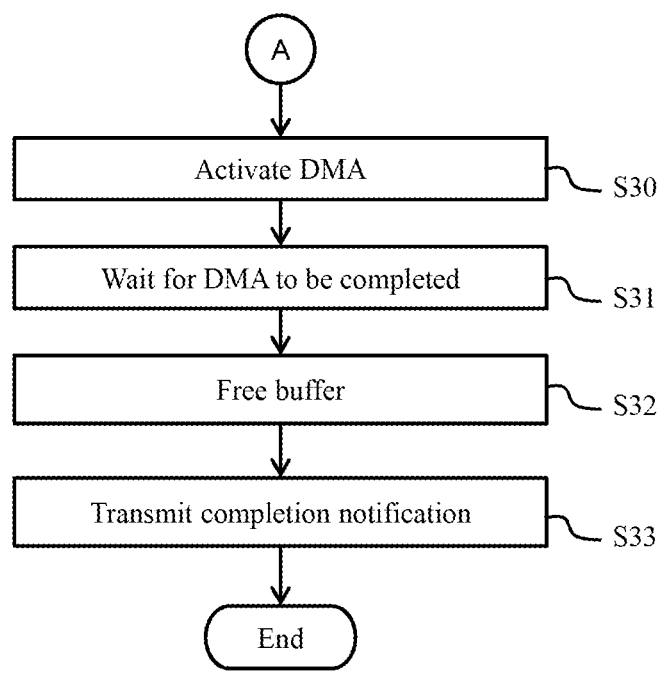
FIG. 20 is a flowchart continued from FIG. 19.

FIG. 19 is a flowchart of a parity calculation process carried out by the FM processor 1510. FIG. 20 is a flowchart continued from FIG. 19.

The FM processor 1510 first analyzes a parity calculation request message received from the CPU 130 in the DKC 100 (S10). The parity calculation request message will be described below with reference to FIG. 21. The reference sign of the FM processor 1510 may be hereinafter omitted; the FM processor 1510 may be hereinafter represented as the FM processor.

The FM processor initializes the address of a work area configured in the RAM 140. Specifically, the FM processor 1510 configures a null for the address of the work area (S11).

A loop process for each data is started. The FM processor determines whether all input data on which a parity calculation is to be executed has been processed (S12). Upon determining that all the input data on which a parity calculation is to be executed has been processed (S12: YES), the FM processor proceeds to a flowchart in FIG. 2 via an in connector A. On the other hand, upon determining that some of the input data on which a parity calculation is to be executed remains unprocessed (S12: NO), the FM processor proceeds to the next step S13.

The FM processor selects the next input data (S13) and determines whether the address of the selected input data is valid (S14). Upon determining that the address of the selected input data is invalid (S14: NO), the FM processor returns to step S12.

Upon determining that the address of the input data selected in step S13 is valid (S14: YES), the FM processor reserves a buffer area in which the input data is stored, on the buffer memory 153 (S15).

The FM processor converts a logical address into a physical address (S16). That is, the FM processor references the FM address mapping table T15 shown in FIG. 11 to determine a physical address on the flash memory 152 corresponding to a logical address specified as the address of input data.

The FM processor configures command parameters in the FM controller 1513 to activate the FM controller 1513 (S17). The command parameters include, for example, a read command, a physical address, a data size, and a transfer destination address, that is, the address of the input data buffer.

The activated FM controller 1513 transmits a signal to the flash memory 152 to read data from the flash memory 152. Then, the FM processor waits for the data read by the FM controller 1513 to be completed (S18).

The FM processor determines whether a work area have been reserved (S19). That is, the FM processor determines whether the address of the work area is null. Upon determining that the work area has been reserved (S19: NO), the FM processor configures the address of an input data buffer area to be the address of the work area (S20). That is, the FM processor uses the input data buffer area reserved during the current loop (S15) as a work area.

Upon determining that work areas have been reserved for all the input data on which a parity calculation is to be executed (S19: YES), the FM processor activates the parity calculation circuit 1512 (S21). Specifically, the FM processor specifies the address of the work area for each input data, the address of each input data buffer area, and the data size of each input data for the parity calculation circuit 1512. The FM processor writes particular values to an activation register.

Thus, the parity calculation circuit 1512 reads data from the work areas and the input data buffer areas and carries out a parity calculation using the data as an input. The parity calculation circuit 1512 writes the result of the calculation to the work areas. The FM processor 1510 waits for the calculation in the parity calculation circuit 1512 to be completed (S22).

FIG. 20 is a flowchart continued from FIG. 19. The FM processor activates the DMAC 1511 (S30). That is, the FM processor specifies transfer parameters for the DMAC 1511 and writes particular values to the activation register. For the transfer parameters, the FM processor, for example, configures a result storage destination address for a transfer destination, configures the addresses of work areas for a transfer source, and configures the size of data to be transferred.

Thus, the DMAC 1511 reads data from the work areas and writes the data to the result storage destination address. The FM processor waits for the DMA transfer by the DMAC 1511 to be completed (S31).

The FM processor frees the buffers (S32). That is, the FM processor frees the input data buffers (one of the buffers has also been used as a work area) reserved during the parity calculation process. Finally, the FM processor transmits a completion message to the CPU 130, having requested the parity calculation, to end the process.

FIG. 21 shows the format of a parity calculation request message. The message is transmitted from the CPU 130 to the FM processor 1510 and specifies parameters for a parity calculation to be carried out by the FM processor 1510.

The result storage destination address is an address at which data output as the result of the parity calculation is stored and which corresponds to the transfer destination of DMA transfer. The data length is the length of data to be created and can be expressed in terms of the number of sectors.

The RAID level is the RAID level of the RAID group in which the target data is stored. The number of drives is indicative of the number of drives forming the RAID group. The creation target data number indicates which data in the stripe is to be created (recovered).

The logical address of the input data is the address of the input data for a parity calculation. According to the present embodiment, the FM processor 1510 manages mapping between the logical addresses on the flash memory 152 and the physical addresses. Thus, the parity calculation request message specifies logical addresses. If the CPU 130 manages the mapping between the logical addresses and the physical addresses, the parity calculation request message may specify physical addresses.

Figure 22:
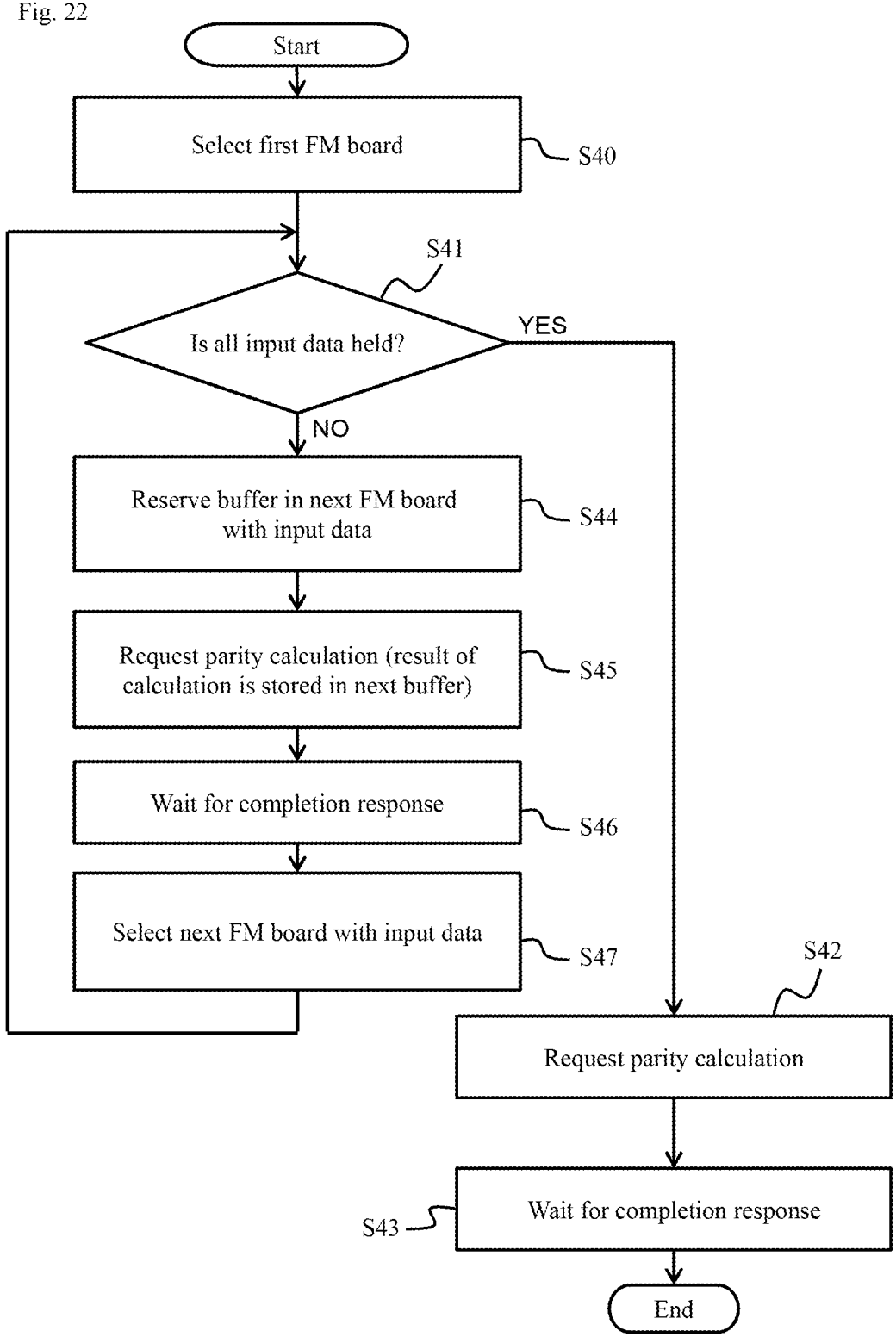
FIG. 22 is a flowchart showing a process common to parity calculations which is executed by a storage controller (DKC).

FIG. 22 shows a flowchart of a process common to parity calculations which is carried out by the CPU 130. The flowchart shown in FIG. 22 shows, in detail, the process common to parity calculations (S54) described below with reference to FIG. 23.

The CPU 130 selects a first cache package (S40). In this case, the cache package means the package of FM caches and is specifically the FM board 150. That is, the CPU 130 selects, as a processing target FM board 150, any one of the FM boards 150 in which the data or parity corresponding to the input data for a parity calculation is stored (S40).

The CPU 130 determines whether the processing target FM board 150 holds all of the data to be input to the parity calculation circuit 1512 in the processing target FM board 150 (S41).

Upon determining that the processing target FM board 150 holds all of the data needed for a parity calculation (S41: YES), the CPU 130 transmits a parity calculation request message to the FM processor 1510 in the processing target FM board 150 (S42). The CPU 130 waits for a response indicating that the parity calculation process is complete to be transmitted by the FM processor 1510 in the processing target board 150 (S43).

Upon determining that a part of all the input data needed for a parity calculation fails to be stored in the processing target FM board 150 (S41: NO), the CPU 130 carries out a parity calculation process through the cooperation of a plurality of FM boards 150 as described with reference to FIG. 15 (S44 to S47).

That is, the CPU 130 reserves a buffer area on the buffer memory 153 in the next FM board 150 with the input data (S44). In the example in FIG. 15, the processing target FM board 150 is the FM board 150(0), and the next FM board with the input data is the FM board 150(1). In the description of steps S44 to S47, parenthesized numbers are added to relevant reference signs.

The CPU 130 issues a parity calculation request message to the FM processor 1510(0) in the processing target FM board 150(0) (S45), and waits for a completion response from the FM processor 1510(0).

The FM processor 1510(0) in the processing target FM board 150(0) carries out a parity calculation and stores intermediate data that is the result of the calculation in the buffer area in the buffer memory 153(1) reserved in step S44. The FM processor 1510(0) responds to the CPU 130 by notifying the CPU 130 of completion.

Upon receiving the completion response from the FM processor 1510(0) in the processing target 150(0), the CPU 130 selects the next FM board 150(1) with the input data as a processing target FM board (S47). The CPU 130 then returns to step S41.

The CPU 130 determines whether the new processing target FM board 150(1) holds all the input data needed for a parity calculation (S41). If the new processing target FM board 150(1) holds all the input data needed for a parity calculation (S41: YES), a parity calculation request message is issued to the FM processor 1510(1) in the new processing target FM board 150(1) as described above (S42).

Figure 23:
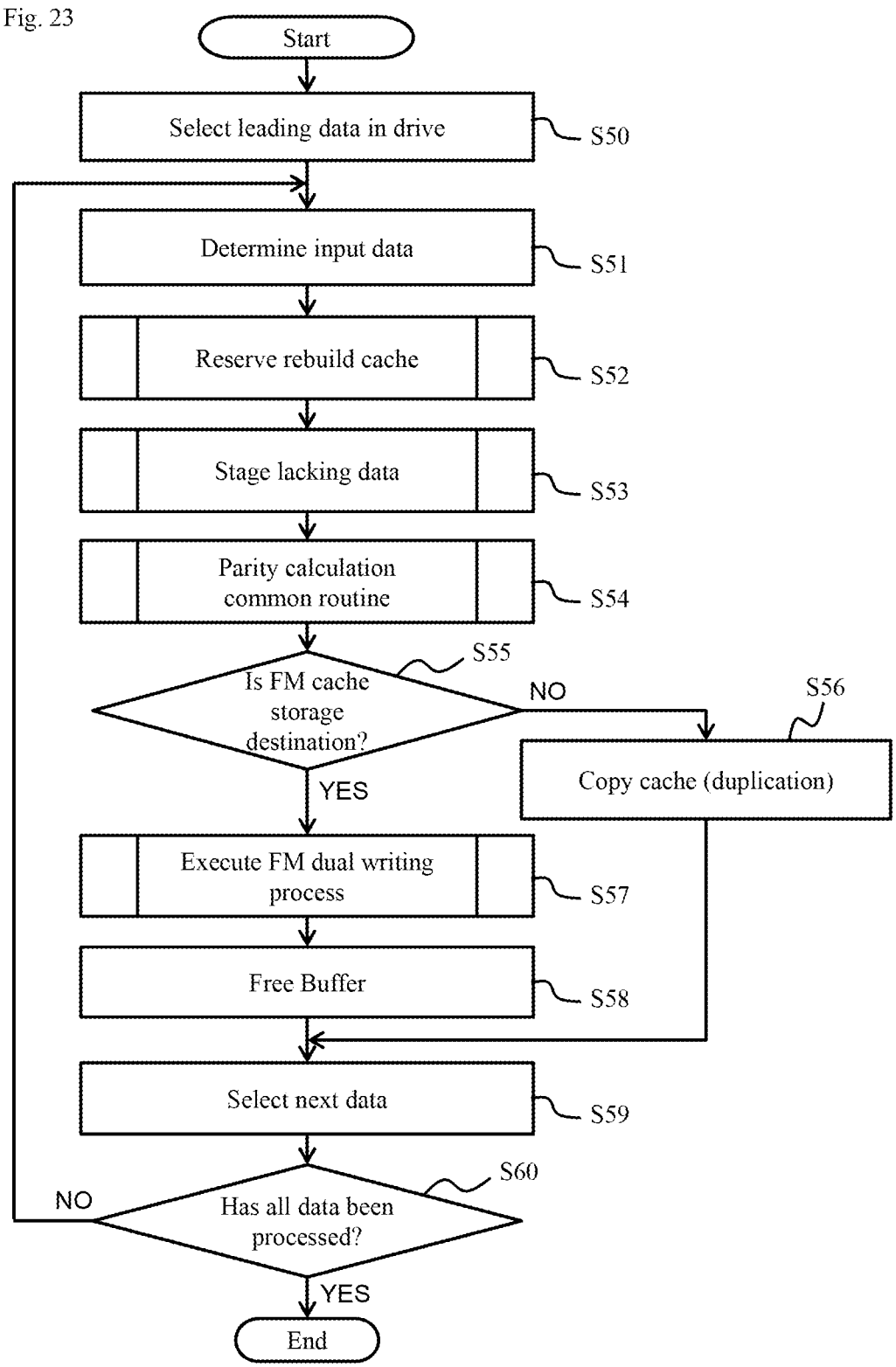
FIG. 23 is a flowchart showing a rebuild process.

FIG. 23 shows a flowchart of a rebuild process. The CPU 130 in the DKC 100 selects the leading data in a recovery target drive as processing target data (S50) and determines input data needed to recover the processing target data (S51). That is, the CPU 130 identifies the other data or parity belonging to the same stripe as that containing the processing target data. Specifically, the input data is included in the data and parities contained in those drives in the RAID group management table other than the processing target drive which belong to the same RAID group as that to which the processing target drive belongs, and is stored in the same intra-drive addresses as those of the processing target data.

The CPU 130 carries out a process for reserving a rebuild cache (S52), a process for staging lacking data (S53), and the process common to parity calculations (S54). The processes S52 and S53 will be described below. The details of the process common to parity calculations (S54) are as described with reference to FIG. 2.

The CPU 130 determines whether recovered data is to be stored in the FM cache or the RAM cache (S55). The FM cache is a cache area configured in the flash memory 152 in the FM board 150, and is also referred to as an FM cache 150. The RAM cache is a cache area configured in the RAM 140, and is also referred to as a RAM cache 140. One of the FM cache 150 and the RAM cache 140 is selected in accordance with a criterion described below.

Upon determining that the recovered data is to be stored in the RAM cache (S55: NO), the CPU 130 duplicates the data by copying the data from one RAM cache in which the data is stored to the other RAM cache (S56).

The CPU 130 selects the next data in the recovery target drive as processing target data (S59), and determines whether all the data in the recovery target drive has been processed (all the data has been recovered) (S60). Upon determining that some of the data remains unprocessed (S60: NO), the CPU 130 returns to S51. Upon determining that all the data has been recovered (S60: YES), the CPU 130 ends the present processing.

In contrast, upon determining, in step S55, that the recovered data is to be stored in the FM cache 150 (S55: YES), the CPU 130 carries out an FM dual writing process (S57) described below.

After the FM dual writing process, the CPU 130 frees the buffer area reserved in the buffer memory 153 (S58), and selects the next data in the recovery target drive as processing target data (S59). The CPU 130 then determines whether all the data in the recovery target drive has been processed (all the data has been recovered) (S60). Specifically, when the currently processed data corresponds to the trailing data in the drive, this means that all the data has been recovered. As described above, upon determining that some of the data remains unprocessed (S60: NO), the CPU 130 returns to step S51. Upon determining that all the data has been recovered (S60: YES), the CPU 130 ends the present processing.

Figure 24:
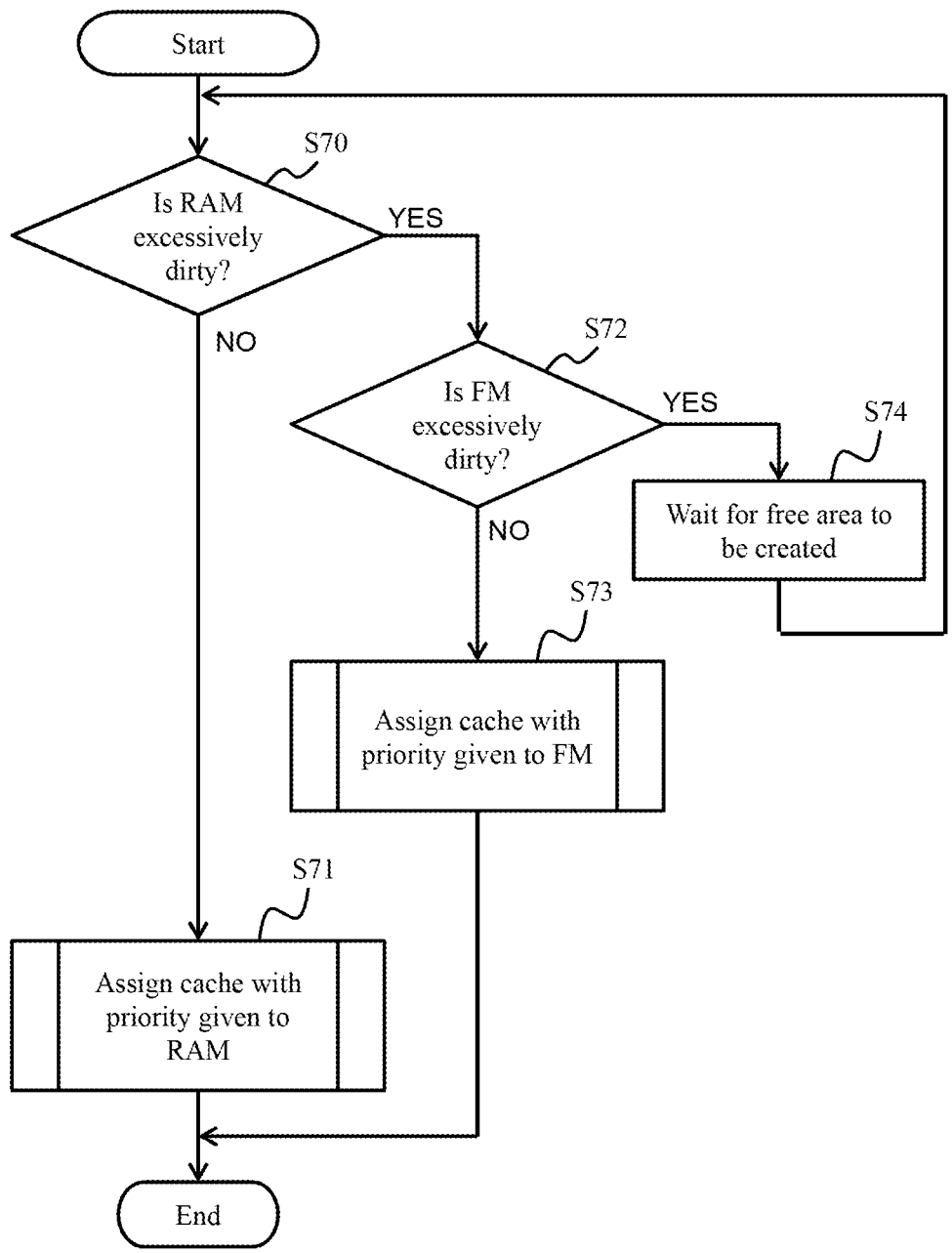
FIG. 24 is a flowchart showing a process for reserving a cache for a rebuild process.

FIG. 24 is a flowchart showing the details of the rebuild cache reservation process (S52 in FIG. 23).

The CPU 130 determines whether the RAM is excessively dirty (S70). The excessively dirty RAM means that the proportion of dirty segments to the RAM cache 140 exceeds a predetermined threshold. The threshold is an example of a "predetermined upper limit value". That is, the excessively dirty RAM means that, since a data recovery speed is higher than a speed at which data is written from the RAM cache 140 to the drive 210, dirty data the amount of which is equal to or larger than the threshold has accumulated in the RAM cache 140. The proportion of the dirty segments is calculated by dividing the number of dirty segments in the segment amount management table T16 by the total number of segments.

Upon determining that dirty data the amount of which is equal to or larger than the threshold has not accumulated in the RAM cache 140 (S70: NO), the CPU 130 carries out a process for assigning the cache with priority given to the DRAM (S71). The process for assigning the cache with priority given to the DRAM will be described with reference to FIG. 31 and is a process preferentially using the RAM cache 140. After the process for assigning the cache with priority given to the DRAM, the CPU 130 ends the present processing and returns to the processing in FIG. 23.

Upon determining that dirty data the amount of which is equal to or larger than the threshold has accumulated in the RAM cache 140 (S70: YES), the CPU 130 determines whether the FM is excessively dirty (S72). The excessively dirty FM means that the proportion of dirty segments to the FM cache 150 exceeds a second predetermined threshold. The second threshold is an example of a "second predetermined upper limit value". That is, the excessively dirty FM corresponds to a state in which recovered data is consecutively stored in the FM cache 150 to reduce areas available for normal I/O processes.

Upon determining that dirty data the amount of which is equal to or larger than the second threshold has not accumulated in the FM cache 150 (S72: NO), the CPU 130 carries out a process for assigning the cache with priority given to the FM (S73). The process for assigning the cache with priority given to the FM will be described with reference to FIG. 30 and is a process preferentially using the FM cache 150. After the process for assigning the cache with priority given to the FM, the CPU 130 ends the present processing and returns to the processing in FIG. 23.

Upon determining that dirty data the amount of which is equal to or larger than the second threshold has accumulated in the FM cache 150 (S72: YES), the CPU 130 waits for a sufficient free area to be created in the FM cache 150 (S74) and then returns to step S70.

Figure 25:
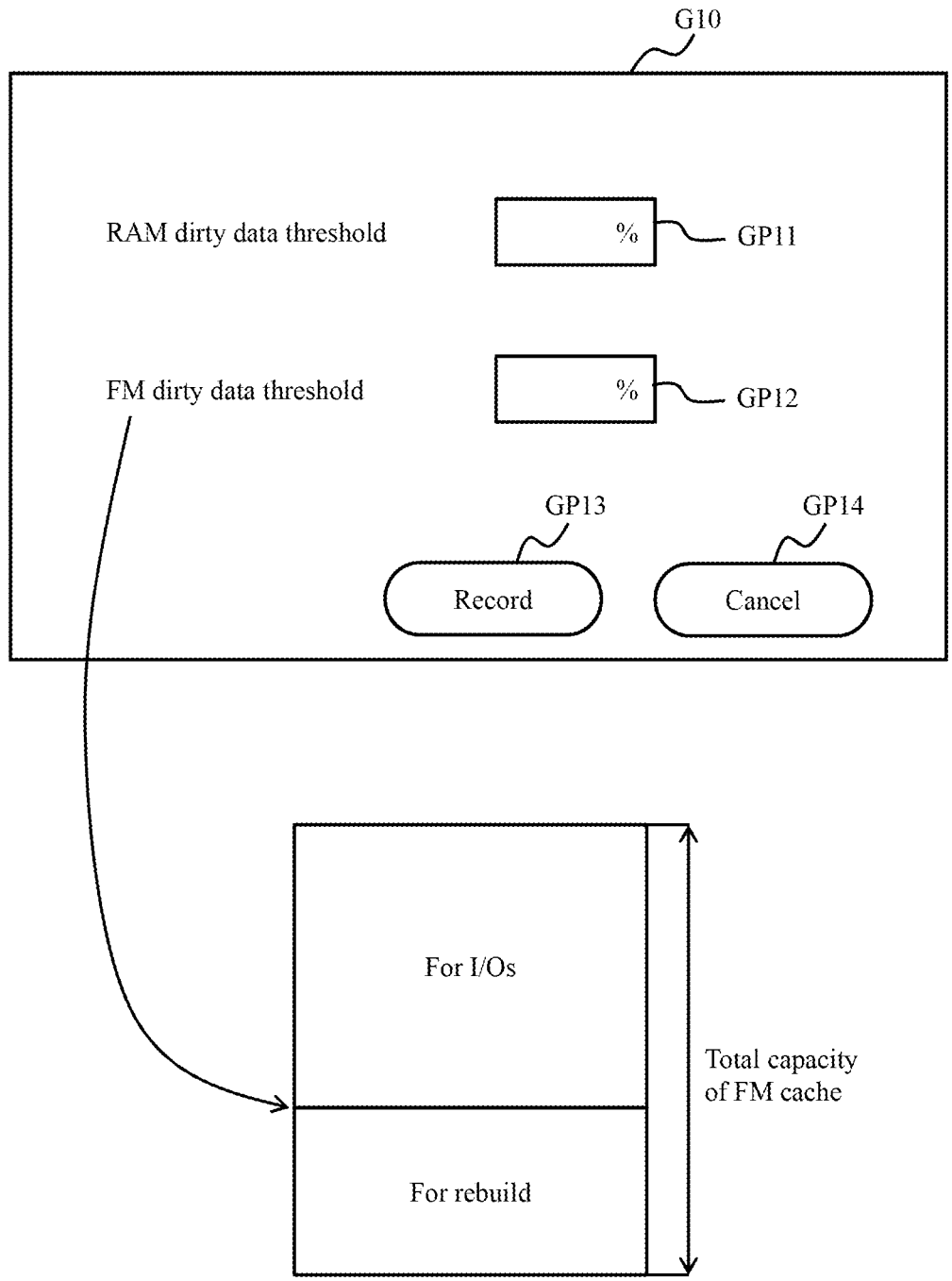
FIG. 25 is an exemplary configuration of a screen for setting a threshold for selection of a memory.

FIG. 25 shows an exemplary screen used for a system administrator to configure the threshold for determining whether the RAM is excessively dirty and the second threshold for determining whether the FM is excessively dirty. The system administrator can display a screen G10 shown in FIG.

25 on a display of the management computer 30 and configure the thresholds for the storage system 10 through the screen G10.

The threshold configuration screen G10 includes, for example, an input section GP11 for inputting a RAM dirty data threshold, an input section GP12 for inputting an FM dirty data threshold, an entry button GP13, and a cancel button GP14.

The system administrator can input, via the input section GP11, the RAM dirty data threshold indicating that the RAM is excessively dirty. The system administrator can input, via the input section GP12, the FM dirty data threshold indicating that the FM is excessively dirty. When the system administrator operates the entry button GP13, the input threshold is transmitted to the storage system 10 and configured in the DKC 100. When the system administrator operates the cancel button GP14, the input is cancelled and the display returns to a menu screen (not shown in the drawings).

The FM dirty data threshold specifies an upper limit on the proportion of a cache area for rebuild to the total capacity of the FM cache 150 as shown in the lower side of FIG. 25. A certain percentage or less of the entire area in the FM is used as a cache for a rebuild process. The remaining part of the area is used as a cache for normal I/O processes.

When a predetermined percentage (or a predetermined amount) of the entire area in the FM cache 150 is used for a rebuild process as described above, a decrease in the cache area available for normal I/O processes can be suppressed. That is, by limiting the percentage or amount of a part of the FM cache 150 available for a rebuild process to a predetermined value, the present embodiment can prevent response performance for normal I/O processes from being degraded and complete a rebuild process in a short time.

The screen G10 in FIG. 25 includes the two input sections, that is, the input section GP11 allowing the threshold for the RAM cache 140 to be configured and the input section GP12 allowing the threshold for the FM cache 150 to be configured. However, the screen G10 may exclusively include the input section GP12 allowing the threshold for the FM cache 150 to be configured.

Figure 26:
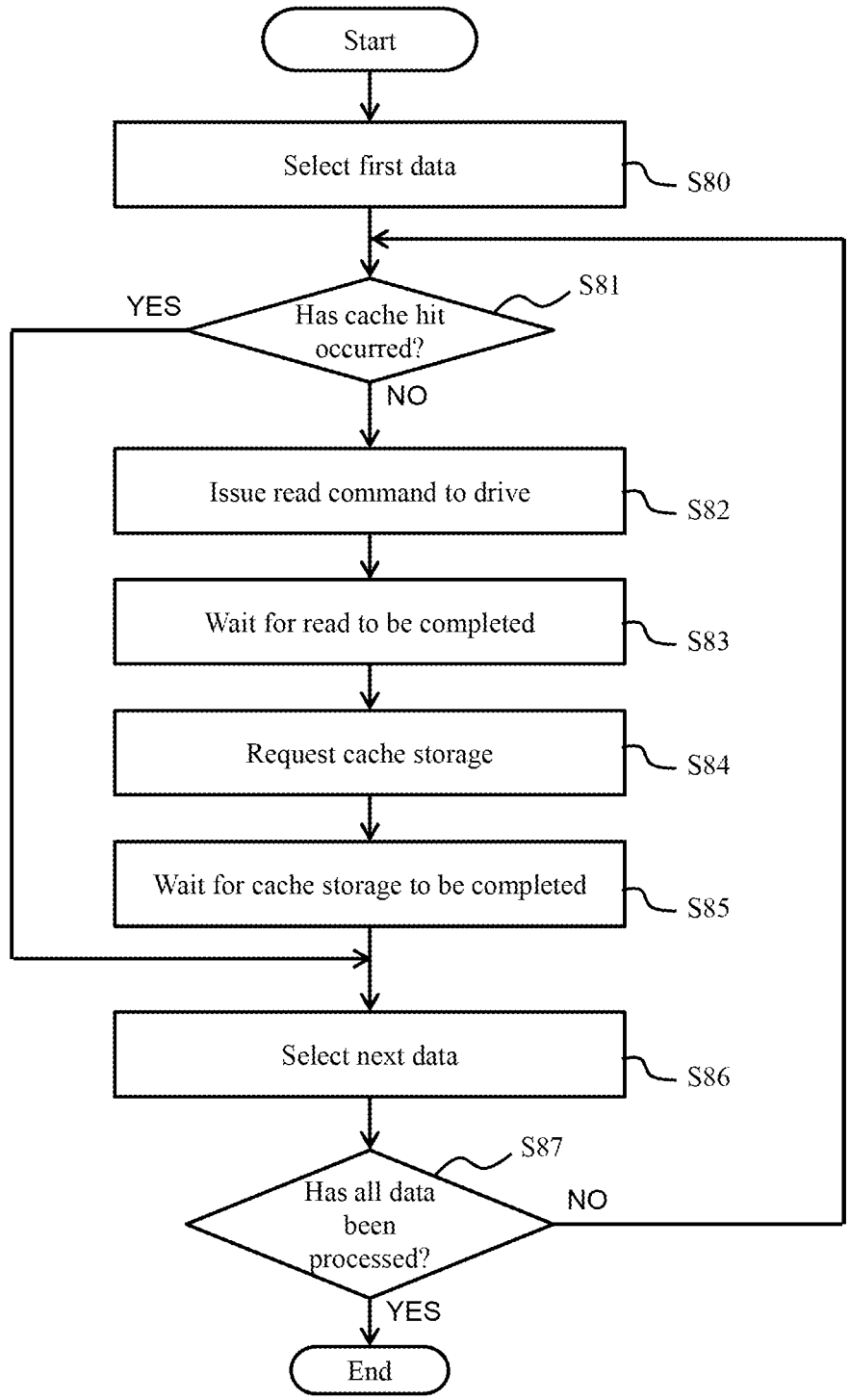
FIG. 26 is a flowchart showing a process for staging lacking data for a rebuild process in a memory.

FIG. 26 is a flowchart showing the details of a process for staging lacking data (S53 in FIG. 23). The lacking data is a lacking portion of the data needed for a parity calculation process (the data to be input to the parity calculation circuit 1512). In the process shown in FIG. 26, the lacking data is read from the drive 210 and stored in the FM cache 150.

The CPU 130 selects the first data of the input data needed for a parity calculation as processing target data (S80). The CPU 130 references the cache directory 310 to determine whether all the processing target data is stored in the FM cache 150, that is, whether a cache hit has occurred (S81).

Upon determining that cache miss has occurred (S81: NO), the CPU 130 issues a read command to the drive 210 storing the target data (S82). Specifically, the CPU 130 creates a CDB (Command Descriptor Block) for an SCSI read command, specifies the CDB and the buffer address of a data read destination, and activates a back end interface 120. Thus, the back end Interface 120 issues the read command to the drive 210. The CPU 130 waits for a read completion response to be returned from the drive 210 (S83).

The CPU 130 issues a cache storage request to the FM processor 1510 in the FM cache 150 (FM board 150) that is a staging destination (S84). Specifically, the CPU 130 specifies the address of the buffer memory 153 in which data read from the drive 210 is temporarily stored, the logical address of the FM cache 150 at which the data is to be stored, and the data length to create a cache storage request message. The CPU 130 transmits the cache storage request to the FM processor 1510. Subsequently, the CPU 130 waits for the processing target data read from the drive 210 to be stored in the FM cache 150 (S85).

Upon receiving the cache storage request message, the FM processor 1510 stores the data transferred from the drive 210 to the buffer memory 153 in the FM cache 150. The FM processor 1510 then returns a completion response to the CPU 130. To be exact, the FM processor 1510 transfers and stores the processing target data stored in the buffer memory 153 to and in the flash memory 152, and notifies the CPU 130 that the storage of the data in the flash memory 152 is complete.

The CPU 130 selects the next data of the lacking data as processing target data (S86), and determines whether the staging process has been carried out on all the lacking data (S87). Upon determining that some of the lacking data remains unprocessed (S87: NO), the CPU 130 returns to step S81.

On the other hand, upon determining that a cache hit has occurred for the processing target data (S81: YES), that is, upon determining that the processing target data is stored in the FM cache 150, the CPU 130 skips the processing in steps S82 to S85.

The CPU 130 selects the next data of the lacking data as processing target data (S86), and determines whether all the lacking data has been processed (S87). Upon determining that some of the lacking data remains unprocessed (S87: NO), the CPU 130 returns to step S81.

When the staging process has been carried out all the lacking data as described above (S87: YES), the CPU 130 ends the present processing and returns to the processing in FIG. 23.

Figure 27:
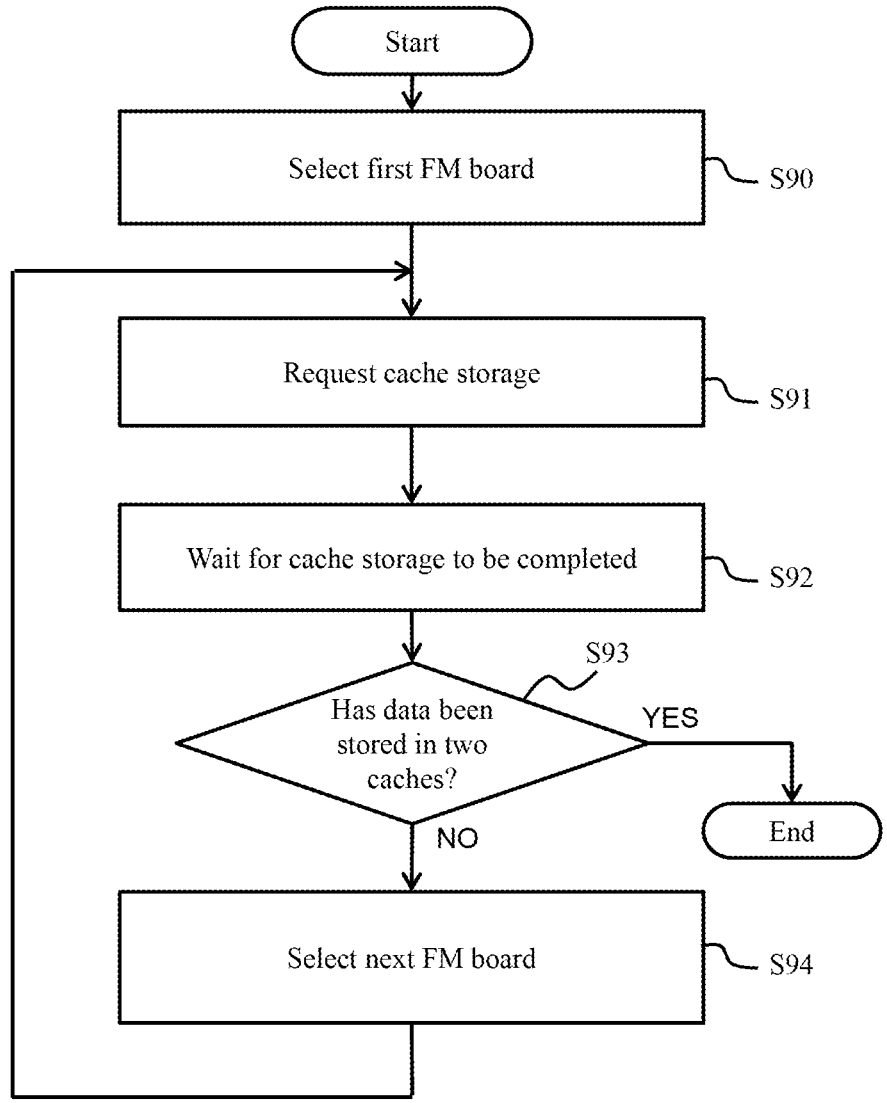
FIG. 27 is a flowchart showing a process for writing recovered data to a plurality of flash memories.

FIG. 27 is a flowchart of an FM dual writing process (S57 in FIG. 23). The CPU 130 selects a first cache package. That is, the CPU 130 selects a first FM board 150 in which recovered data is to be stored (S90).

The CPU 130 requests the FM processor 1510 in the FM board 150 selected in step S90 to store the recovered data in the FM cache 150 (flash memory 152) (S91). After issuing a cache storage request in step S91, the CPU 130 waits for a completion response to be returned from the FM processor 1510 (S92).

The CPU 130 determines whether the recovered data has been stored in two different FM caches 150 (S93). The storage of the data in two different caches is expressed as "Has data been stored in two caches?".

In step S93, the CPU 130 determines whether the current process has been carried out on the second FM board 150 (FM cache) or the first FM board 150.

Upon determining that the recovered data has been written to the second FM board 150 (S93: NO), that is, upon determining that the recovered data has been stored in the first FM board 150, the CPU 130 returns to step S91. Upon determining that the recovered data has been written to the two different FM boards 150 (FM caches) (S93: YES), the CPU 130 ends the present processing and returns to FIG. 23.

Figure 28:
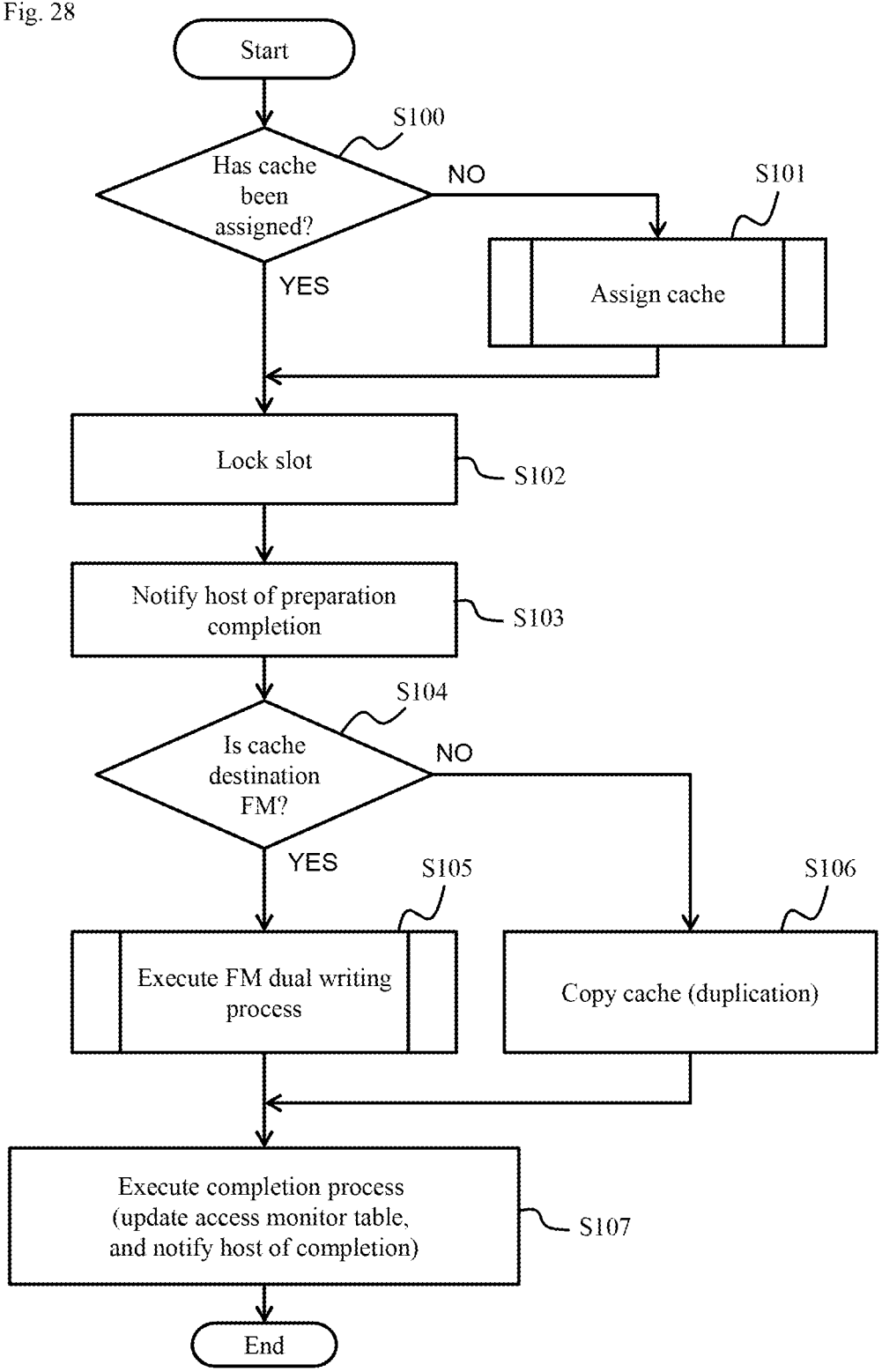
FIG. 28 is a flowchart showing a write command process.

FIG. 28 is a flowchart showing a write command process. The CPU 130 starts the present processing upon receiving a write command from the host computer 20. The CPU 130 references the cache directory 310 to determine whether the cache segment 300 corresponding to a write target address specified in the write command has been assigned (S100).

Upon determining that the cache segment 300 corresponding to the write target address has not been assigned (S100: NO), the CPU 130 proceeds to a cache assignment process described below (S101). To allow write data to be duplicated to improve reliability, two or more cache segments in which write data is stored may be reserved.

The CPU 130 locks a write target slot (S102) when a cache segment in which the write data is to be stored has been assigned (S100: YES) or when the cache assignment process (S101) is complete. The slot status of the SLCB 302 shown in FIG. 9 includes a bit indicating that the slot is "locked". The CPU 130 turns the bit on to lock the slot.

The CPU 130 notifies the host computer 20 that the write data can be received (S103). The CPU 130 transmits, for example, XFER_RDY to the host computer 20 that the system is ready to receive the data.

The CPU 130 determines whether the assigned segment is a segment 300F in the FM cache 150 (S104). Upon determining that the segment assigned to the write data is an FM cache segment 300F (S104: YES), the CPU 130 stores the write data received from the host computer 20 in a plurality of different FM cache segments 300F (S105).

Upon determining that the segment assigned to the write data is a RAM cache segment 300R (S104:NO), the CPU 130 stores the write data received from the host computer 20 in a plurality of different RAM cache segments 300R (S106). In either case, the write data is duplicated before being stored, thus improving the reliability.

Finally, the CPU 130 updates the access monitor table 113 and reports to the host computer 20 that the process for the write command is complete (S107). That is, the CPU 130 adds the amount of data received via the current write command to the write amount counter C135 in the access monitor table 113 and increments the write command counter C137.

Figure 29:
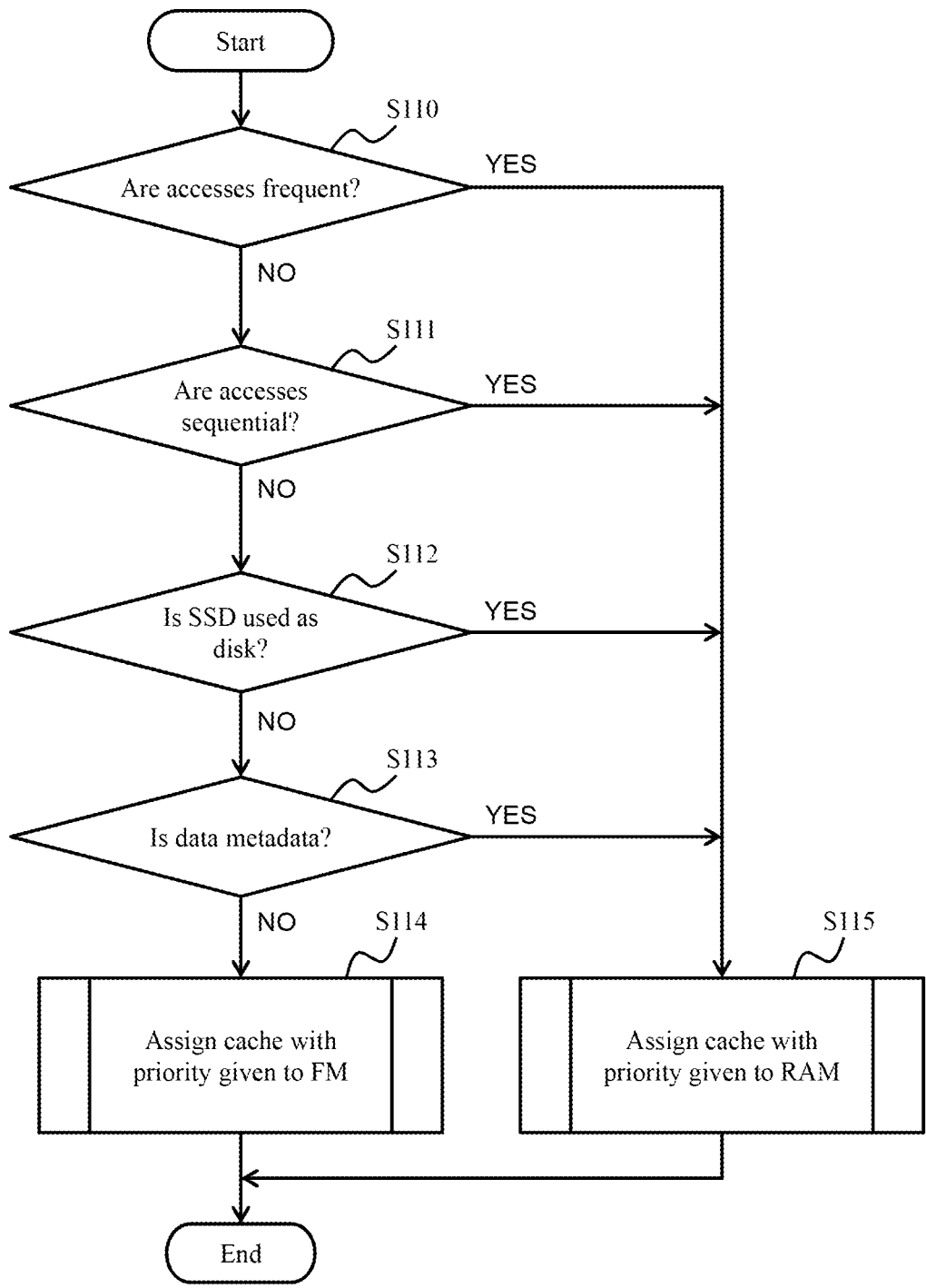
FIG. 29 is a flowchart showing a process for assigning a cache in which write data is to be stored.

FIG. 29 is a flowchart showing the details of a cache assignment process (S101 in FIG. 28). As described below, the CPU 130 assigns an FM cache segment 300F or a RAM cache segment 300R according to a preconfigured predetermined assignment condition.

The CPU 130 determines whether access target data is frequently accessed data (S110). Upon determining that the access frequency of the access target data is equal to or larger than a predetermined access frequency (S110: YES), the CPU 130 carries out a process for assigning the cache with priority given to the DRAM (S115).

Upon determining that the access frequency of the access target data is less than the predetermined access frequency (S110: NO), the CPU 130 determines whether the access target data involves a sequential accesses pattern (S111).

Whether or not the access target data involves a sequential access pattern is determined by determining, for example, whether the processing target read command is a part of a series of commands for reading data at consecutive addresses in order. For example, whether the access target data involves a sequential access pattern is determined by determining whether or not the target address of the last read command plus the transfer length of the current command corresponds to the target address of the current read command.

Upon determining that the access target data involves a sequential access pattern (S111: YES), the CPU 130 proceeds to step S115. Data written by the host computer 20 through sequential accesses is unlikely to be reused after caching. Therefore, a segment assigned to data written through sequential accesses is freed and made unassigned after a destage process and is subsequently assigned to other data. That is, data involved in sequential accesses has a short cache data lifetime. Consequently, if the data is written to the FM cache segment 300F, the flash memory 152 is repeatedly rewritten and hence has a shortened lifetime. This is because the number of times the flash memory 152 can be rewritten is limited. Thus, according to the present embodiment, data written through sequential accesses is cached in the RAM 140.

Upon determining that the access target data does not involve a sequential access pattern (S111: NO), the CPU 130 determines whether the drive 210 in which the target data is finally stored is a flash memory device (SSD) (S112).

Upon determining that the target data is finally stored in the SSD drive (S112: YES), the CPU 130 proceeds to step S115. Data can be written faster to the SSD drive than to hard disk drives. Thus, to take advantage of the high write speed, the target data is cached in the RAM 140.

Upon determining that the target data is not finally stored in the SSD drive (S112: NO), the CPU 130 determines whether the target data is metadata (S113). The metadata as used herein includes control information taken from the RAM 140 in the DKC 100 and saved to or stored in the drive 210. Upon determining that the target data is metadata (S113: YES), the CPU 130 proceeds to step S115.

Upon determining that the target data is not metadata (S113: NO), the CPU 130 carries out a process for assigning the cache with priority given to the FM (S114).

Figure 30:
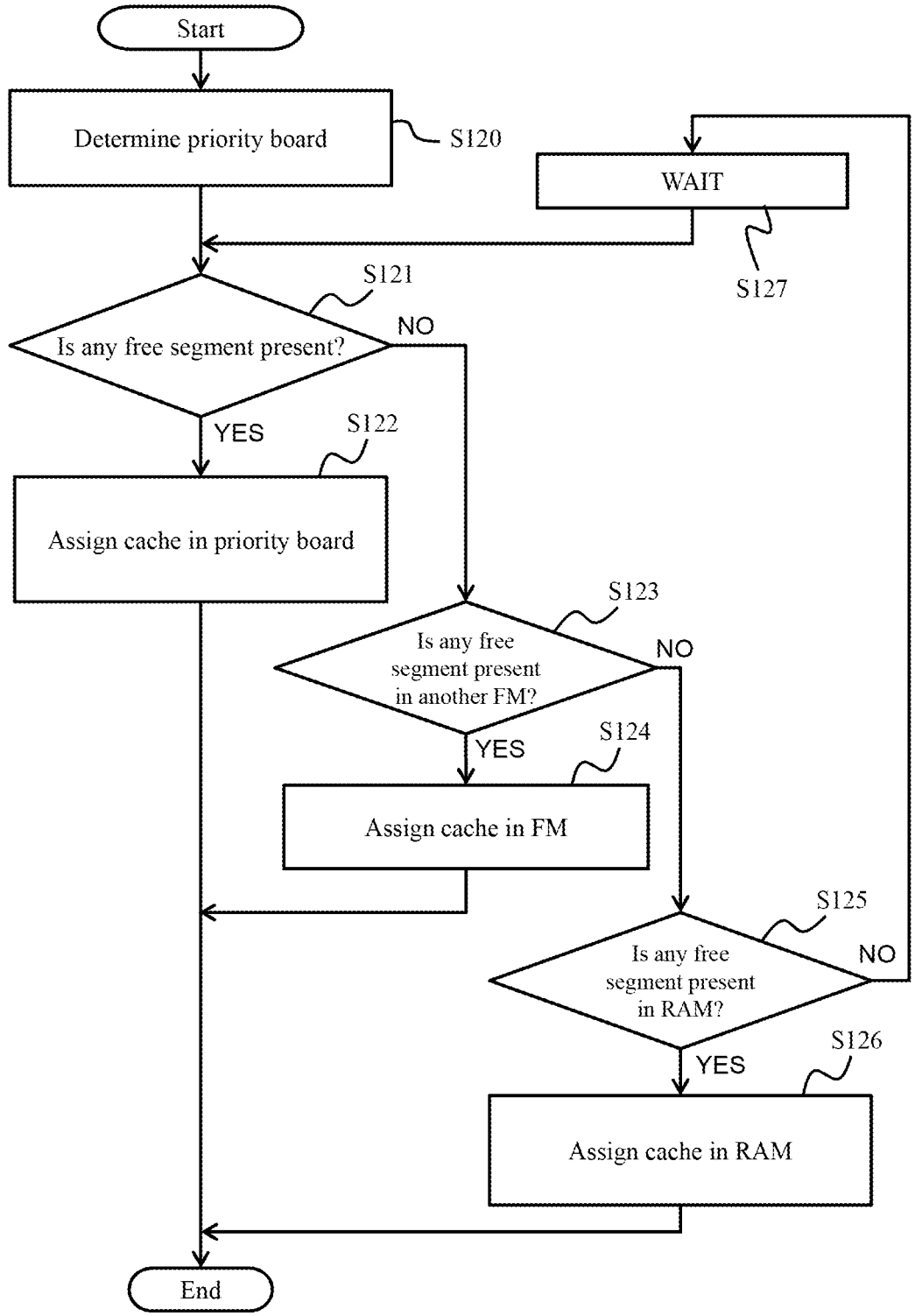
FIG. 30 is a flowchart showing a process for caching write data in a flash memory.

FIG. 30 is a flowchart showing the details of the process for assigning the cache with priority given to the FM (S114).

The CPU 130 determines a priority board (S120). This process is intended to gather data needed for parity creation. The CPU 130 selects one of the FM boards 150 to which a cache segment is preferentially assigned, in accordance with a predetermined selection criterion.

An exemplary selection criterion is such that, for example, the number of the priority board is equal to the logical address ADR of the access target divided by the size PL of the stripe further divided by the number of the FM boards NB.

The CPU 130 determines whether the selected priority board 150 has any available FM cache segment 300F (S121). The available FM cache segment 300F refers to an unoccupied segment and specifically to a free segment or a clean and unlocked segment.

Upon determining that the priority board 150 has an available FM cache segment 300F (S121: YES), the CPU 130 assigns a cache segment in the priority board 150 to the data (S122). If a clean segment is assigned, the clean segment is cut off from a clean queue or a cache directory into a free segment, which is then assigned to the data.

A detailed example of a segment assignment process will be described. The CPU 130 configures the segment ID of a cachet target segment and a memory type (FM) in the SGCB 301. The CPU 130 configures a pointer to the cache target segment in the SGCB pointer in the SLCB 302.

If the cache directory 310 contains no SLCB 302 to which the target SGCB 301 is to be coupled, the CPU 130 configures the contents of any SLCB 302, couples the SLCB 302 to the cache directory 310, and then couples the target SGCB 301 to the SLCB 302. Furthermore, if SGCBs 301 other than the target SGCB 301 are already coupled to the SLCB 302, the CPU 130 couples the target SGCB 301 to the terminal of a list of the preceding SGCBs 301.

Upon determining that the priority board 150 has no available FM cache segment 300F (S121: NO), the CPU 130 determines whether any other FM board 150 has an available FM cache segment (S123).

Upon determining that a different FM board 150 has an available FM cache segment 300F (S123: YES), the CPU 130 assigns an FM cache segment 300F in the different FM board 150 as a cache destination for the target data (S124).

Upon determining that none of the FM boards 150 has an available FM cache segment 300F (S123: NO), the CPU 130 determines whether the RAM 140 has an available RAM cache segment 300R (S125).

Upon determining that the RAM 140 has an available RAM cache segment 300R (S125:YES), the CPU 130 assigns the RAM cache segment 300R as a cache destination for the target (S126).

Upon determining that none of the RAMs 140 has an available RAM cache segment 300R (S125: NO), the CPU 130 waits for an FM cache segment 300F or a RAM cache segment 300R to be made available (S127). When an FM cache segment 300F or a RAM cache segment 300R is made available, the CPU 130 returns to step S121.

Figure 31:
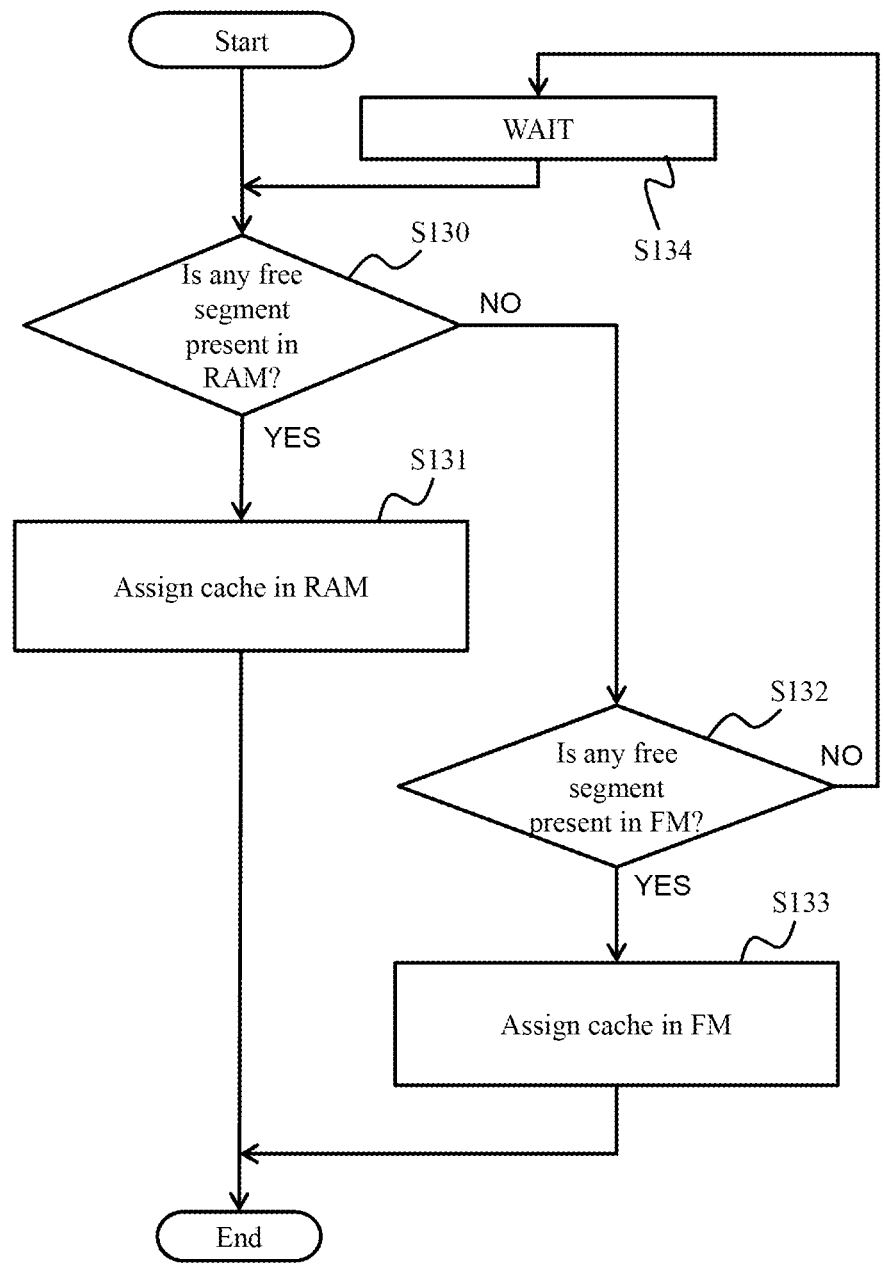
FIG. 31 is a flowchart showing a process for caching write data in a RAM.

FIG. 31 is a flowchart showing the details of a process for assigning the cache with priority given to the RAM (S115 in FIG. 29).

The CPU 130 determines whether any RAM cache segment 300R is available (S130). Upon determining that a RAM cache segment 300 is available (S130: YES), the CPU 130 assigns the RAM cache segment 300 as a cache destination for the target data (S131).

Upon determining that no RAM cache segment 300R is available (S130: NO), the CPU 130 determines whether any FM cache segment 300F is available (S132).

Upon determining that an FM cache segment 300 is available (S132: YES), the CPU 130 assigns the FM cache segment 300F as a cache destination for the target data (S133).

Upon determining that no FM cache segment 300F is available (S132: NO), the CPU 130 waits for either a cache segment 300R or a cache segment 300F to be made available (S314). When either a cache segment 300R or a cache segment 300F is made available, the CPU 130 returns to step S130.

The present embodiment configured as described above can exert such effects as described with reference to FIG. 1. That is, since the parity calculation circuit 1512 in the FM board 150 is used to carry out a parity calculation, the CPU 130 in the storage controller 100 need not execute a parity calculation. Thus, loads on the CPU 130 can be reduced. As a result, the CPU 130 can carry out other types of command processing, allowing the response performance of the storage system 10 to be improved.

The parity calculation circuit 1512 can be relatively inexpensively added to the FM board 150 to reduce the loads on the CPU 130.

The present embodiment considers a rebuild process to be complete when recovered data is written to a plurality of flash memories 152 and thus made redundant. Thus, the time needed for the rebuild process can be reduced.

In the present embodiment, the rebuild process is considered to be completed by recovering data by the parity calculation circuit 1512 in the FM board 150 and writing the recovered data to a plurality of flash memories 152 on the respective different FM boards 150. Thus, the rebuild process can be ended in a relatively short time, with loads on the CPU 130 reduced. This improves the reliability.

In the present embodiment, a rebuild process is considered to be completed by, first, writing recovered data to the drive 210 via the RAM 140, and when the amount of the RAM 140 used reaches a predetermined upper limit value, writing the recovered data to a plurality of flash memories 152, as described with reference to FIG. 24. Thus, according to the present embodiment, a destage process is carried out in advance to write as many recovered data to the drive 210 as possible, and when the drive 210 becomes full to prevent further writes, a dual writing process is executed on the flash memory 152 to make the recovered data redundant early. Therefore, the present embodiment can complete a rebuild process early while reducing as many dirty data as possible.

Embodiment 2

A second embodiment will be described with reference to FIG. 32. The present embodiment corresponds to a variation of the first embodiment and will thus be described focusing on differences from the first embodiment. According to the present embodiment, when a parity calculation fails to be carried out only by the FM board 150, the FM board 150 cooperates with the CPU 130, a higher control apparatus, in carrying out the parity calculation.

Figure 32:
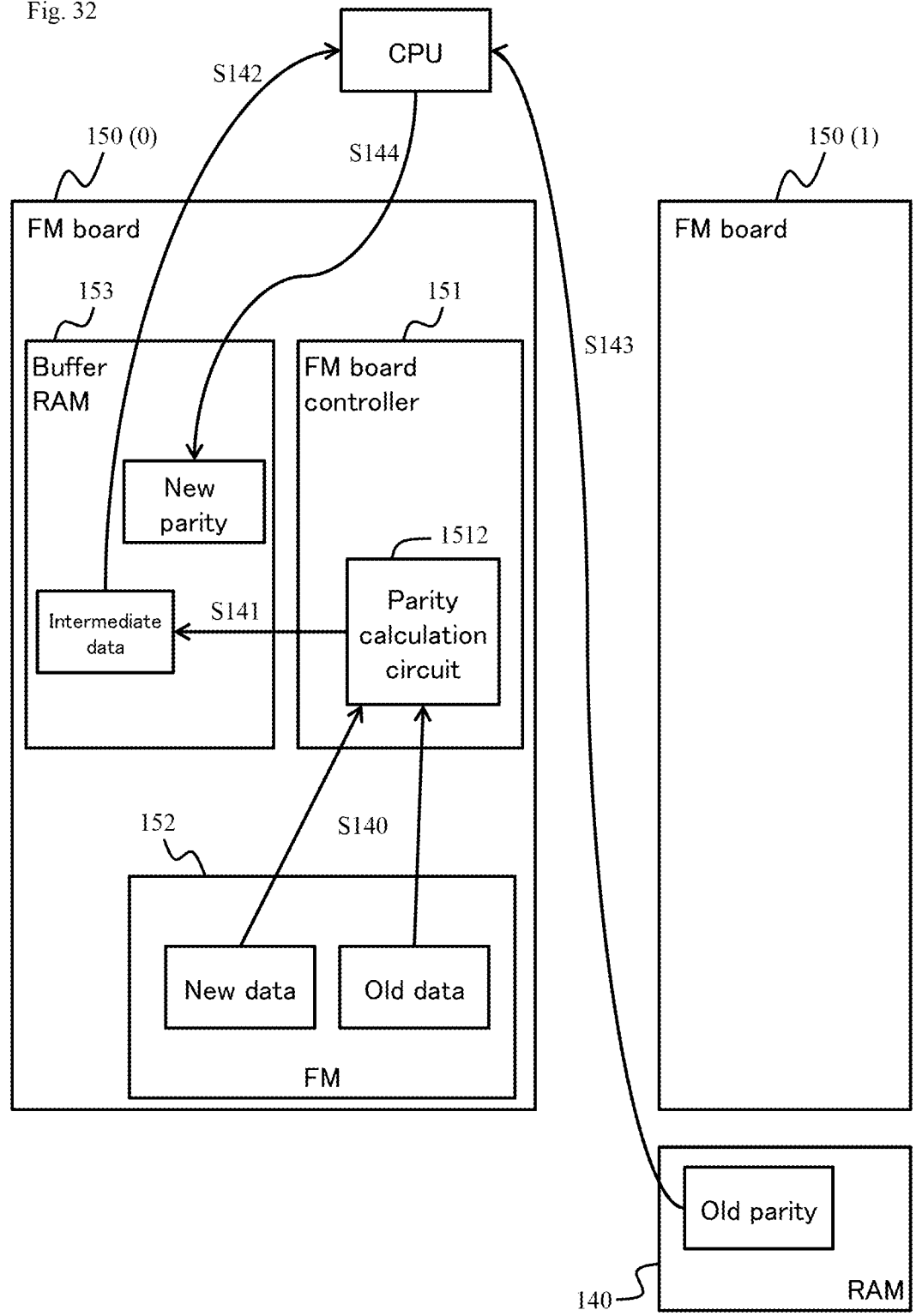
FIG. 32 is a diagram illustrating how a CPU of the storage controller and an FM board cooperate with each other in carrying out a parity calculation according to a second embodiment.

FIG. 32 shows that, when data is distributed between the FM board 150 and the RAM 140 for a parity calculation, the CPU 130 and the FM board 150 cooperate with each other in calculating a new parity.

FIG. 32 shows that new data and old data are cached in the flash memory 152 in the FM board 150 and that an old parity is cached in the RAM 140.

The parity calculation circuit 1512 in the FM board 150 reads the new data and the old data from the flash memory 152 (S140), calculates the data, and stores the result of the calculation in the buffer memory 153 as intermediate data (S141).

The CPU 130 reads the intermediate data from the buffer memory 153 (S142) and reads the old parity from the RAM 140 (S143). Based on this, a parity calculation is carried out to calculate a new parity (S144). The CPU 130 stores the calculated new parity in the buffer memory 153 in the FM board 150.

According to the present embodiment configured as described above, even when the data needed for a parity calculation is distributed between the FM board 150 and the RAM 140, the FM board 150 and the CPU 130 can cooperate with each other in executing the parity calculation. The present embodiment may be configured to transmit the data held in the FM board 150 (in this case, the new data and the old data) directly to the CPU 130 instead of calculating the intermediate data using the parity calculation circuit 1512 so that the CPU 130 can carry out the parity calculation.

The present invention is not limited to the above-described embodiments. Those skilled in the art can make various additions, changes, or the like to the embodiments without departing from the scope of the present invention. For example, the present invention can be understood as a system carrying out a parity calculation in the FM board 150.

Expression 1.

A storage system having a memory apparatus and plurality of storage apparatuses, the storage system including:

a control apparatus configured to control the memory apparatus and the plurality of storage apparatuses, and a first memory apparatus included in the memory apparatus and having a parity calculation function, wherein the control apparatus is configured to allow the first memory apparatus to hold target data for a parity calculation process, and the first memory apparatus is configured to input the target data to the parity calculation function to carry out a parity calculation and outputs a result of the calculation.

Expression 2.

The storage system set forth in Expression 1, wherein the first memory apparatus is provided in plurality, the control apparatus allows one of the plurality of first memory apparatuses to hold a first partial data that is a part of the target data and allows another of the plurality of first memory apparatuses to hold a second partial data that is a remaining part of the target data, the one of the plurality of first memory apparatuses is configured to input the first partial data to the parity calculation function of the one of the plurality of first memory apparatuses to calculate intermediate data, and the other of the plurality of first memory apparatuses is configured to input the intermediate data acquired from the one of the plurality of first memory apparatuses and the second partial data to the parity calculation function of the other of the plurality of first memory apparatuses to carry out a parity calculation and to output a result of the calculation.

Expression 3.

The storage system set forth in Expression 2, wherein the control apparatus controllably allows a predetermined first memory apparatus of the plurality of first memory apparatuses to hold the target data.

Expression 4.

A first memory apparatus able to communicate with a control apparatus, the first memory apparatus being configured:

to have a parity calculation function,
to hold target data for a parity calculation process,
to input the target data to the parity calculation function to carry out a parity calculation, and
to output a result of the parity calculation.

REFERENCE SIGNS LIST

10 Storage system
20 Host computer
30 Management computer
100 DKC
110 Front end interface
120 Back end interface
130 CPU
140 RAM
150 FM board
152 Flash memory
153 Buffer memory
1510 FM processor
1511 DMAC
1512 Parity calculation circuit

The invention claimed is:

1. A storage system comprising a plurality of memory apparatuses and plurality of storage apparatuses, the plurality of storage apparatuses forming a parity group for data recovery, the storage system comprising:

a control apparatus configured to control the plurality of memory apparatuses and the plurality of storage apparatuses;

a first memory apparatus included in the plurality of memory apparatuses and having a parity calculation function and a large capacity; and a second memory apparatus included in the plurality of memory apparatuses and having a smaller capacity than the first memory apparatus, wherein the control apparatus is configured such that, when carrying out a data recovery process for recovering target data stored in a storage apparatus, of the plurality of storage apparatuses, which is a recovery target, the control apparatus acquires other data and a parity needed to recover the target data, transmits the acquired other data and parity to the first memory apparatus, and allows the first memory apparatus to carry out a predetermined parity calculation using the calculation function to recover the target data;

wherein the first memory apparatus is provided in plurality, and when recovered data resulting from recovery of the target data is stored in the plurality of first memory apparatuses, the control apparatus considers the data recovery process to be complete;

wherein the second memory apparatus is provided in plurality, the control apparatus is configured to use either the plurality of first memory apparatuses or the plurality of second memory apparatuses as a temporary storage destination for the recovered data, and when the plurality of second memory apparatuses is used as the temporary storage destination for the recovered data, the control apparatus is configured to write the recovered data stored in one of the plurality of second memory apparatuses to a predetermined storage apparatus which is a substitute for the recovery target storage apparatus; and wherein the control apparatus is configured to switch the temporary storage destination for the recovered data to the plurality of first memory apparatuses when an amount of the recovered data stored in the plurality of second memory apparatuses reaches a preconfigured predetermined upper limit value.

2. The storage system according to claim 1, wherein the control apparatus is configured to suspend execution of the data recovery process when an amount of the recovered data stored in the plurality of first memory apparatuses reaches another preconfigured predetermined upper limit value.

3. The storage system according to claim 2, wherein the control apparatus is configured to transfer the data from the storage apparatuses to a predetermined first memory apparatus of the plurality of first memory apparatuses, such that the other data and the parity needed to recover the target data are stored in the predetermined first memory apparatus.

4. The storage system according to claim 3, wherein the control apparatus is configured such that:

when the other data and the parity needed to recover the target data are all stored in one of the plurality of first memory apparatuses, the control apparatus carries out the predetermined parity calculation using the calculation function of the first memory apparatus, when predetermined partial data of the other data and the parity is stored in one of the plurality of first memory apparatuses, the control apparatus carries out the predetermined parity calculation using the calculation function of the first memory apparatus using the predetermined partial data, and outputs intermediate data, and the control apparatus transmits the intermediate data to one of the plurality of first memory apparatuses which stores predetermined remaining data of the other data and the parity other than the predetermined partial data, and carries out the predetermined parity calculation using the calculation function of the first memory apparatus using the intermediate data and the predetermined remaining data, to recover the target data.

5. The storage system according to claim 4, wherein the control apparatus is configured to, when the predetermined remaining data is stored in the second memory apparatus, carry out the predetermined parity calculation based on the intermediate data acquired from the first memory apparatus and the predetermined remaining data acquired from the second memory apparatus to recover the target data.

6. The storage system according to claim 5, wherein the control apparatus is configured to:

upon receiving a write command from a higher apparatus, select either the plurality of first memory apparatuses or the plurality of second memory apparatuses as a temporary storage destination for write data in accordance with a preconfigured selection criterion;

upon selecting the plurality of first memory apparatuses, alternately select one of the plurality of first memory apparatuses for each stripe and store the write data in the selected first memory apparatuses; and upon selecting the plurality of second memory apparatuses, store the write data in the plurality of second memory apparatuses.

7. The storage system according to claim 6, wherein the plurality of first memory apparatuses each comprise a first memory, a buffer memory, a parity calculation circuit configured to implement the calculation function, and a memory control processor configured to control the first memory, the buffer memory, and the parity calculation circuit, the parity calculation circuit carries out the predetermined parity calculation to create the recovered data and stores the recovered data in the buffer memory, and the memory control processor transmits the recovered data stored in the buffer memory to either the plurality of first memory apparatuses or the plurality of second memory apparatuses in accordance with an indication from the control apparatus.

\* \* \* \* \*